United States Patent [19]

Sandman et al.

[11] 4,205,967
[45] Jun. 3, 1980

[54] ADSORBENT FRACTIONATOR WITH SYSTEM GAS POWERED CYCLE CONTROL AND PROCESS

[75] Inventors: Leslie W. Sandman, Ithaca; Paul M. McKey, Cortland, both of N.Y.

[73] Assignee: Pall Corporation, Glen Cove, N.Y.

[21] Appl. No.: 958,452

[22] Filed: Nov. 6, 1978

Related U.S. Application Data

[63] Continuation-in-part of Ser. No. 816,639, Jul. 18, 1977, abandoned.

[51] Int. Cl.² ............................................. B01D 53/04
[52] U.S. Cl. .......................................... 55/21; 55/33; 55/58; 55/62; 55/68; 55/74; 55/163; 55/179; 55/387
[58] Field of Search .................... 55/18, 21, 33, 58, 62, 55/68, 74, 75, 161, 163, 179, 208, 387, 389

[56] References Cited

U.S. PATENT DOCUMENTS

| | | | |
|---|---|---|---|
| 3,176,444 | 4/1965 | Kiyonaga | 55/58 X |
| 3,192,686 | 7/1965 | Berkey et al. | 55/21 |
| 3,395,511 | 8/1968 | Akerman | 55/33 X |
| 3,498,025 | 3/1970 | Bednarski | 55/33 |
| 3,659,399 | 5/1972 | Kauer, Jr. et al. | 55/33 |
| 3,703,068 | 11/1972 | Wagner | 55/21 |
| 3,775,946 | 12/1973 | Brazzel | 55/58 |
| 3,923,479 | 12/1975 | Glass et al. | 55/33 X |
| 4,013,429 | 3/1977 | Sircar et al. | 55/33 |

*Primary Examiner*—Robert H. Spitzer

[57] ABSTRACT

A method and apparatus are provided for adsorbing a first gas from a mixture thereof with a second gas, to reduce the concentration of the first gas in the mixture to below a desired maximum concentration, in which the adsorption cycle is timed according to the rate of fill through an orifice of a space of predetermined volume by withdrawing a portion of system gas, feeding such system gas portion into a space of predetermined volume through an adjustable orifice, accumulating the withdrawn system gas in the space, and discontinuing the adsorption cycle when the volume and/or pressure of accumulated system gas in the space reaches or exceeds a predetermined minimum, thereby making it possible to control the cycling independently of any external control or power source.

61 Claims, 10 Drawing Figures

ADSORBENT FRACTIONATOR WITH SYSTEM GAS POWERED CYCLE CONTROL AND PROCESS

This application is a continuation-in-part of Ser. No. 816,639, filed July 18, 1977, and now abandoned.

Adsorption gas fractionators have been marketed for many years, and are in wide use throughout the world. The usual type is made of two adsorbent beds, one of which is being regenerated while the other is on the adsorption cycle. The gas to be fractionated is passed through one sorbent bed in one direction in the adsorption cycle, and then, after a predetermined time interval, when the sorbent can be expected to have adsorbed so much of the gas being removed that there is a danger that the required low concentration of that gas in the effluent will not be met, the influent gas is switched to the other sorbent bed, and the spent sorbent bed is regenerated by heating and/or be evacuation and/or by passing purge effluent gas therethrough, usually in counterflow, and at a reduced pressure.

Adsorbent gas fractionators on the market today are of two general types, a heat-reactivatable type, in which heat is applied to regenerate the spent sorbent at the conclusion of the adsorbent cycle, and a heatless type, in which heat is not applied to regenerate the spent sorbent at the conclusion of the adsorbent cycle, but in which a purge flow of pure gas, usually effluent gas from the bed on the adsorption cycle, is passed through the spent bed at a lower pressure, with rapid cycling to conserve the heat of adsorption, to aid in the regeneration of the spent bed. The use of a purge gas to regenerate at a lower pressure than the line pressure of the gas being dried is not however confined to heatless types, but is also used in heat-reactivated adsorbent bed fractionators.

Both types of adsorbent gas fractionators are normally operated with fixed-time sorbing and regenerating cycles, usually equal in duration, with the length of the cycles being fixed according to the volume of sorbent available, and the content of the gas to be removed by adsorption from the influent gas mixture. The time of the cycle is invariably fixed and is not in proportion to the volume of influent gas passed through the bed, in order to ensure that the content of the effluent gas will always meet the system requirements.

As the adsorption cycle proceeds, and the total volume of gas passed through the bed increases, the sorbent bed becomes progressively more and more saturated, from the inlet end towards the outlet end, and less and less capable of adsorbing first gas that is carried through it by the influent gas. Removal of the first gas from the influent gas depends upon the rate of flow and the total volume of the gas passed through the bed, and the rate of gas adsorption and total sorbed gas content on the sorbent, as well as the temperature and pressure of gas within the bed. The rate of adsorption by the sorbent may decrease as the sorbent becomes loaded.

Since the volume/flow rate of an influent gas mixture is rarely constant, the demand put upon the sorbent bed can vary. Consequently a fixed time adsorption cycle must always be short enough to give a safe margin for gas removal at maximum first gas content of the influent gas, and this means that frequently a fixed time cycle must be rather short, to be sure it is ended before the available remaining first gas capacity of the bed reaches too low a level. This means, of course, that in the average cycle, the capacity of the sorbent bed may not be well utilized.

The life of a sorbent that is heated in order to regenerate it is to a considerable extent dependent upon the frequency of regeneration. It is a rule of thumb, that a sorbent bed is good for a certain number of regenerations, and no more. Obviously, then, the effective life of a bed may be shortened unnecessarily, whenever during each adsorption cycle before regeneration the capacity for the first gas being removed is not effectively utilized. Furthermore, the inability to achieve a full utilization of the effective bed capacity during each adsorption cycle, both in the case of heat-reactivated and heatless sorbent gas fractionators, means that the volume of the sorbent bed must be more than what might be required to provide the reserve capacity needed to adsorb extreme but occasional high volumes in the influent gas during the fixed time period of the adsorption cycle.

Inefficient utilization of sorbent capacity also leads to a considerable waste of purge gas with each cycle. Purge gas is normally bled off from the effluent gas for the purpose of regeneration of a spent bed, and correspondingly reduces the yield of effluent. Each time a bed is transferred from the adsorption cycle to the regenerating cycle, a volume of purge gas equal to the open volume of the sorbent bed vessel is necessarily dumped, and lost. Short cycling means higher purge losses than long cycling.

Such losses are particularly severe in the case of heatless fractionators, which require much more frequent cycling. Indeed, the choice between a heat-regenerated and a heatless adsorbent fractionator frequently is dictated by the frequency of recycling required.

Skarstrom in U.S. Pat. No. 2,944,627, dated July 12, 1960, describes a type of heatless dryer which purports to represent an improvement on those described some years earlier by Wynkoop, U.S. Pat. No. 2,800,197, dated July 23, 1957, and in British Pat. Nos. 633,137 and 677,150. Skarstrom showed that by very rapid cycling between adsorption and desorption in the respective zones, the desorption cycle could effectively utilize the heat of adsorption for regeneration of spent desiccant. Skarstrom accordingly taught the use of times in the adsorption cycle not exceeding two to three minutes, preferably less than one minute, and very desirably less than twenty seconds. Such cycling times are of course shorter than Wynkoop's which was of the order of thirty minutes, or higher, as shown in the graph of FIG. 2, or the cycling times ranging from five minutes to thirty minutes, of British Pat. No. 633,137. British Pat. No. 677,150 demonstrated that the adsorption and desorption cycles need not necessarily be equal.

The drawback of the Skarstrom system, however, is the very considerable volume of purge gas lost with each cycle, and this loss is very much greater at a cycling time of, for instance, ten seconds, as compared to the British patents' five to thirty minutes, and Wynkoop's thirty minutes or longer. In the short Skarstrom cycles, of course, the capacity of the desiccant bed is very little utilized, but when no heat is applied to effect regeneration of the desiccant, it becomes more important not to carry the moisture content of the adsorbent beyond a certain minimum on the adsorption cycle, or it will be impossible effectively to regenerate the adsorbent on the regeneration cycle.

Adsorbent gas fractionators have been provided with moisture detectors in the effluent line, to measure dew points in the effluent gas. Because of their slow response, and relative insensitivity to low dew points, however, such devices have not been and cannot be used to determine the cycling of a dryer when an effluent of low dew point or relative humidity is desired, since by the time the detector has sensed moisture in the effluent, the front has broken through the bed.

Seibert and Verrando, U.S. Pat. No. 3,448,561, patented June 10, 1969, provides a process and apparatus for drying gases which make it possible effectively to utilize the moisture capacity of a desiccant bed by providing for regeneration thereof only when the moisture load on the bed requires it, and thus obtain optimum efficiency in use. During each adsorption cycle, the sorbent can be brought to the limiting moisture capacity at which regeneration can be effected under the available regenerating conditions, whether these be with or without the application of heat, and with or without the application of a reduced pressure. Seibert and Verrando make this possible by detecting the advance of the moisture front within the bed as evidenced by the moisture content of the gas being dried, i.e., as effluent, and halting the drying cycle whenever the front has reached a pre-determined point in the bed, short of breaking out of the bed. This can be done automatically by providing in the desiccant bed means for sensing the moisture content of the gas being dried, and means responsive to moisture content to halt the drying cycle whenever a predetermined moisture content in the gas being dried is reached at that point.

The system is effective for gas dryers, but not for adsorbent gas fractionators where other gases are being removed, the presence of which is difficult to detect by automatic sensing means. Moreover, the system requires an accurate sensing, and if the sensing element is nonresponsive, for whatever reason, the permissible maximum concentration of the gas being removed in the effluent may well be exceeded. Furthermore, the system requires external power for powering the detecting sensors, and in the event of failure of the power source, the system becomes inoperative, even though the adsorbent dryer may continue functional. There are many conditions where the effluent purity must be maintained, regardless of emergency conditions affecting energy or power sources.

In accordance with the present invention, a process and apparatus for fractionating gas mixture are provided which make it possible effectively to time the adsorption cycle of a sorbent bed according to the rate of fill through an orifice of a space of predetermined volume with system gas, either influent gas or, preferably effluent gas that has passed through the bed, by withdrawing from the system gas a portion of system gas, passing the withdrawn system gas into the space and accumulating the gas there; and sensing the volume or pressure of the accumulated gas. When a predetermined volume of gas has been accumulated, the adsorption cycle is terminated, and regeneration can begin. Thus, the timing of the adsorption cycle can be made dependent upon the utilization of the bed, and independent of any external energy or power source.

Accordingly, the process of the invention comprises adsorbing a first gas from a mixture thereof with a second gas, to reduce the concentration of the first gas in the mixture to below a desired maximum concentration; withdrawing a portion of either the gaseous mixture being adsorption or the effluent gas thereof after adsorption, each being referred to generically herein as "system gas"; passing such system gas through an orifice into a space of predetermined volume; accumulating the withdrawn system gas in the space, and discontinuing the adsorption cycle when the volume or pressure of accumulated system gas reaches or exceeds a predetermined minimum.

The volume of system gas passed through the sorbent bed and accumulated can be determined directly, as volume, or indirectly, as pressure.

In a preferred embodiment of the process and apparatus of the invention, a portion of system gas is withdrawn and collected in a gas accumulator with which a pressure-sensitive sensor is connected, responding to and giving a signal when a predetermined minimum pressure is reached. The signal can actuate mechanically or pneumatically a switch which automatically changes the sorbent bed from adsorption to regeneration, concluding the starting adsorption portion of the adsorption cycle, while the gas collected in the accumulator is dumped. If there is a second sorbent bed, it can simultaneously put the regenerated sorbent bed on stream. A like volume of system gas is then collected, in the same proportion, from the second adsorption bed, while the first sorbent bed is being regenerated, for the second half of the adsorption cycle.

In another embodiment, the volume of system gas is accumulated in an expansible reservoir, such as a bellows or a balloon, whose volume at the predetermined limiting volume is such that the expanded reservoir gives a pneumatic or mechanical signal. The reservoir at the predetermined volume may for example release a detent retaining a spring-biased switch from actuation, and in such release actuate a switch which terminates the adsorption.

Pressure-sensitive and volume-sensitive switches are well known and form no part of the instant invention. A pressure-actuated or volume-actuated snap-action switch is preferred, since this gives an immediate response when the predetermined minimum pressure or volume is reached. In any event, to retain independence of cycling control from external power sources, the switch should not of course be electrically operated; it should be pneumatically or mechanically actuated, solely by gas pressure or volume in the accumulator.

Thus, in the process of the invention, the concentration of a first gas in a mixture thereof with a second gas is reduced to below a limiting maximum concentration thereof in the second gas, by passing the mixture in contact with and from one end to another end of a sorbent bed containing a sorbent having a preferential affinity for the first gas; adsorbing first gas thereon to form a gaseous effluent having a concentration thereof below the maximum; separating and collecting a proportion of system gas, either the influent or the effluent gas, in an accumulator; and then discontinuing passing the gaseous mixture in contact with the bed whenever the volume or pressure of system gas in the accumulator reaches a predetermined minimum.

The process and apparatus of the invention are applicable to gas fractionating systems wherein the sorbent bed is heated to effect regeneration, to systems wherein no heat is applied to effect regeneration, to systems wherein regeneration is effected at reduced pressure, to systems utilizing a purge gas flow, and to systems combining one or more of these features.

As a further feature, in accordance with the invention, since the regeneration cycle need not be, and in most cases is not, of a duration equal to the adsorption cycle, the bed being regenerated can be closed off and heating, purge, evacuation, or whatever regeneration system is used, discontinued when regeneration is complete. The remainder of the cycle time can be used, for instance, for cooling down the regenerated bed, so that it is at a convenient and efficient temperature for adsorption, when the flow of influent gas to that bed is resumed.

The drying apparatus in accordance with the invention comprises, as the essential components, a sorbent bed adapted for periodic and preferably counterflow regeneration; a gas accumulator for collecting a portion of system gas flowing to or from the bed; a system gas flow line including an orifice connecting the sorbent bed and the gas accumulator; the orifice restricting system gas flow to the gas accumulator to a selected flow rate; and sensing means in communication with the gas accumulator responsive to a predetermined minimum gas volume or pressure in the accumulator to terminate the adsorption cycle after an interval of time corresponding to the rate of system gas flow through the orifice.

Preferably the apparatus diverts and accumulates effluent gas via an effluent gas flow line to the orifice, so as to avoid contamination and storage corrosion problems inherent in the impure composition of influent gas mixture.

Optionally, the apparatus includes means for applying heat during regeneration of the sorbent bed.

While the apparatus of the invention can be composed of one sorbent bed, the preferred apparatus employs a pair of sorbent beds, disposed in appropriate vessels, which are connected to the line for reception of influent gas to be fractionated, and delivery of the effluent fractionated gas, with a system gas line in each case being in flow communication with the gas accumulator.

The apparatus can also include a second orifice and/or throttling valve for the purpose of reducing pressure during regeneration, and multiple channel valves for cycling the flow of influent gas between the sorbent beds, and for receiving a flow of effluent gas therefrom, together with check valves to divert a portion of the effluent gas as purge in counterflow through the bed being regenerated.

The time required for the system gas content in the accumulator to reach a predetermined level is directly correlated with the sorbent capacity for the first gas, and the volume of gas passed through the bed; a cycle time based on worst case inlet conditions is set by adjusting the size of the orifice opening leading to the gas accumulator.

The orifice can be of fixed dimensions. This is satisfactory for use under fixed conditions. Then, if the cycle time has to be adjusted, the orifice can be replaced by another of the required size. The orifice can also be adjustable by way of a needle or throttling valve, if a variety of conditions can be expected to be encountered, such as with day and night or seasonal variations, differing loads on the system, and differing gas mixtures being sorbed.

The space for gas accumulation is normally limited by practical considerations. For short cycling times, ranging up to several minutes, or slow gas feed rates, the space volume required is not unduly large, and can be provided. However, there are sorbent systems where very long cycle times are possible, and the space required for a gas accumulator impractically large. In such cases, the gas accumulator can be combined with a counter, such that when the space is filled to a predetermined pressure it automatically dumps with the counter counting the number of volumes dumped. The cycle time then is set, to terminate the cycle when a predetermined number of dumpings have been recorded. Predetermining pneumatic counters of conventional known types that do not depend on an external power source for operation are preferred.

The apparatus of the invention is illustrated in the following drawings in which:

FIG. 1 is a schematic view of a two-bed heatless gas fractionator designed to accumulate effluent gas, and in accordance with the invention, showing the four stages of a typical adsorption regeneration cycle in the a, b, c and d views, in which:

Figure 6:
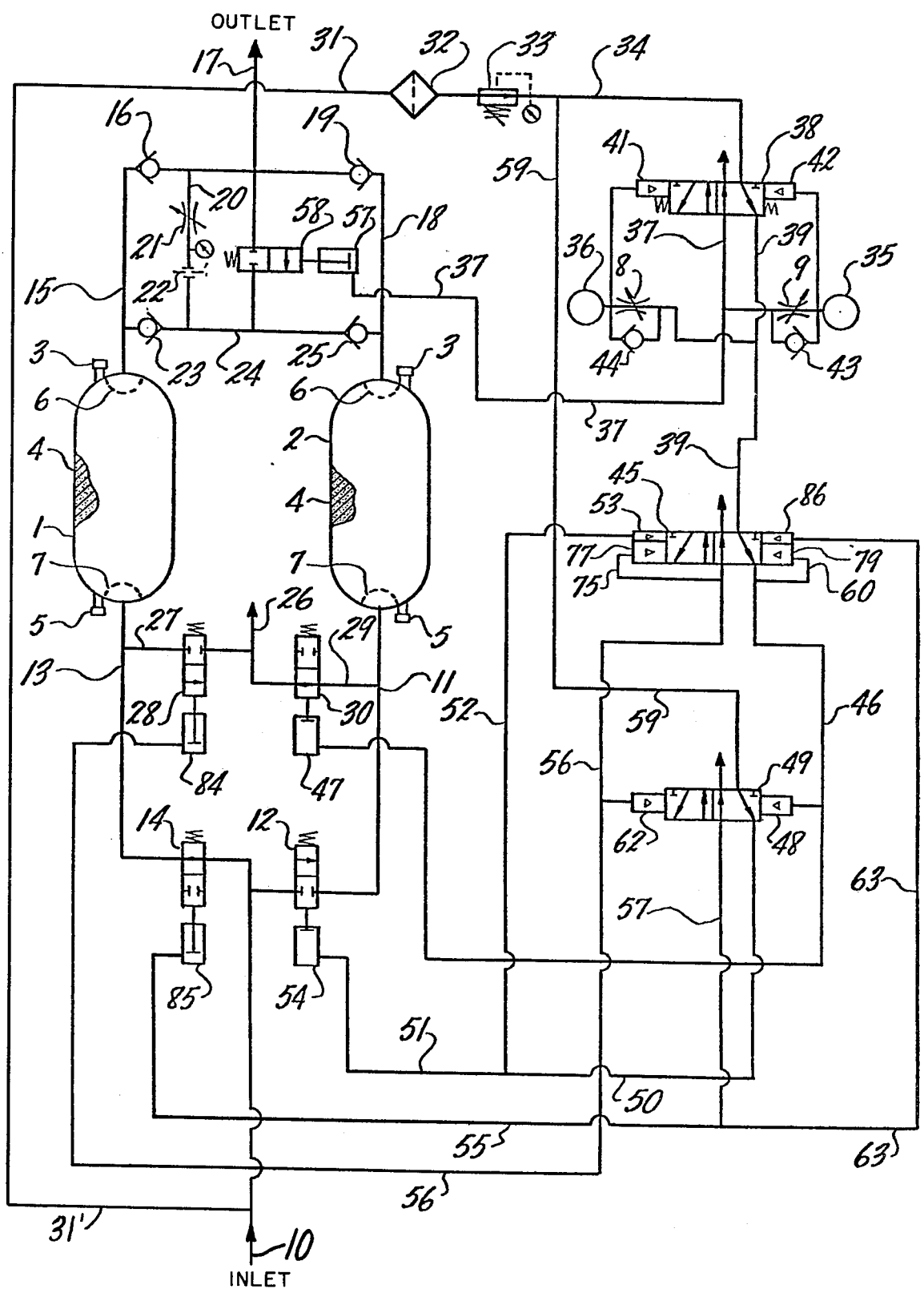
Figure 7:
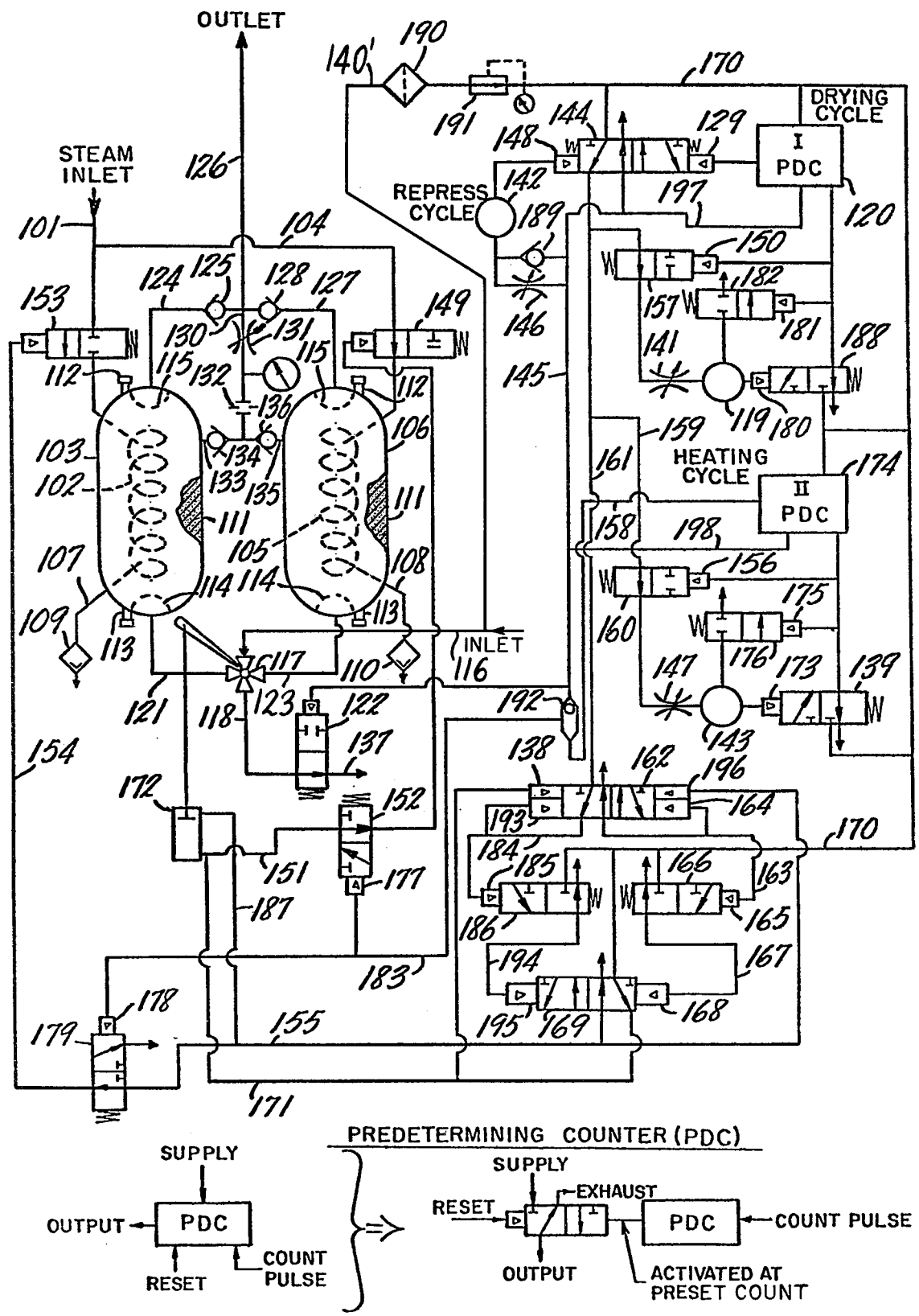

FIG. 6 is a schematic view of a further embodiment of two-bed heatless gas fractionator in accordance with the invention, designed to accumulate influent gas, and showing the fractionator in the first stage of the adsorption cycle, with the left chamber on-stream for adsorption, and the right chamber being regenerated; and FIG. 7 is a schematic view of a two-bed heat-reactivatable gas fractionator in accordance with the invention, designed to accumulate influent gas, and showing the fractionator in the first stage of the adsorption cycle, with the left chamber on-stream for adsorption, and the right chamber being regenerated.

The gas fractionator of FIGS. 1a, 1b, 1c and 1d is composed of a pair of sorbent vessels, 1, 2, which are disposed vertically. Each vessel contains a bed of sorbent 4, such as silica gel. Also provided in the vessles 1, 2 are sorbent fill and drain ports 3, 5 for draining or filling of sorbent in the vessels.

At the bottom of each vessel is a sorbent support 7 made of perforated stainless steel sheet, retaining the sorbent bed 4 in the vessel 1,2.

At the top of each vessel at the outlet therefrom is filter screen 6, which may be removable and is made of sintered stainless wire mesh or perforated stainless steel sheet. This acts to retain any sorbent particles that might otherwise be carried out from the bed 4 to keep the outlet lines and the remainder of the system clean of such particles.

An extensive system of lines is provided, connecting the two vessels for introduction of influent gas containing a first gas to be removed, and for delivery of effluent gas freed from the gas after having passed through the sorbent bed in one of the two vessels, with the necessary valves for switching flow of influent and effluent gas to and from each vessel.

This system includes an inlet line 10. The gas from the inlet line 10 can flow to vessel 1 through line 13 past valve 14, or to vessel 2 via line 11 past valve 12. From vessel 1, the effluent gas passes through line 15 past check valve 16 to the effluent line 17, and from vessel 2 the effluent gas passes through the line 18 past check valve 19 to the effluent line 17. The check valves 16, 19 prevent the effluent gas from entering the other vessel which is being regenerated while the first vessel is on stream for adsorption.

A portion of the effluent gas flow is used for regeneration. For this purpose, line 20 is provided leading past the pressure-reducing and flow-controlling valve 21 and orifice 22, whence the effluent gas can proceed to the vessel 1 via line 24, past check valve 23, or to tank 2 via lines 24, 18 past check valve 25. The check valves 23, 25 prevent the higher pressure effluent gas while one vessel is on-stream for adsorption from bypassing to the other vessel under regeneration. The purge gas after passing through the vessel being regenerated is exhausted via the outlet line 26, passing from vessel 1 through lines 13, 27 past two-way valve 28, or from tank 2 through lines 11, 29 past two-way valve 30.

A further portion of effluent gas is withdrawn by way of line 31 in accordance with the invention, and led through the pressure regulator 33 and filter 32, and then via line 34 and an orifice controlling feed rate into a gas accumulator, for the purpose of controlling the duration of the adsorption cycle. The line 34 leads to the gas accumulators 35 or 36 according to the position of four-way valve 38, the valve in one position via line 37 feeding gas accumulator 35 on the other side of orifice 9, in this case an adjustable bleed valve, and in the other position via line 39 feeding gas accumulator 36 on the other side of orifice 8, also an adjustable bleed valve.

The four-way valve 38 is switched by snap-action actuators 42,41, which are actuated when a predetermined minimum gas pressure in gas accumulators 35,36, respectively, is reached, and actuators 42,41 are triggered, respectively.

The check valves 43,44 provide rapid exhaust of accumulators 35,36 to line 37,39 when valve 38 shifts.

Figure 1A:
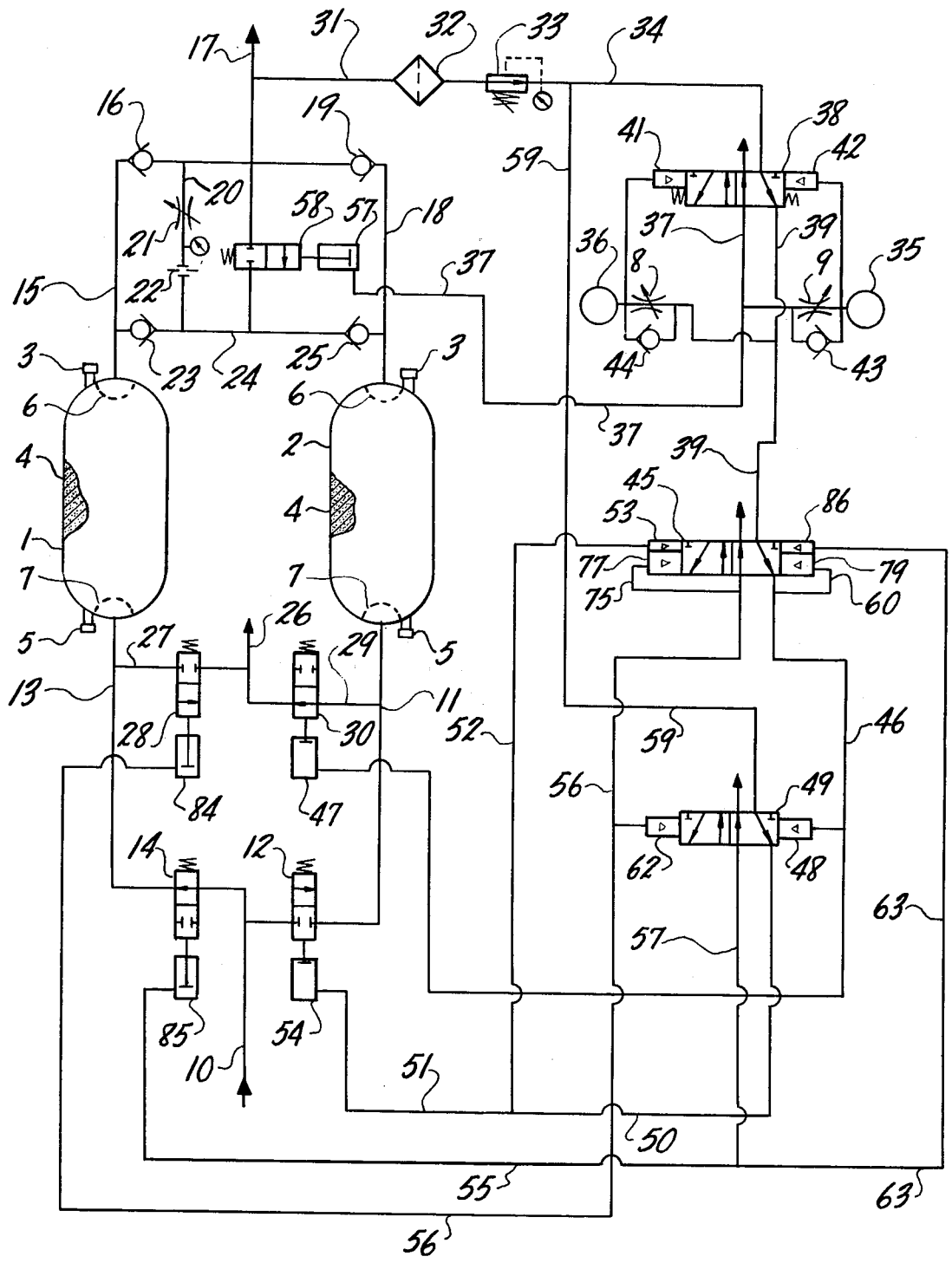
FIG. 1a shows the start of the adsorption cycle, with the left chamber on-stream for adsorption, and the right chamber being regenerated.

At the start of an adsorption cycle, with vessel 1 on stream, the valves 38 and 45 are in the position shown in FIG. 1a, valve 38 directing the gas flow from line 34 to line 39 and then through orifice 8 to gas accumulator 36. A portion of gas effluent is thus accumulated, in the volume 36.

Valve 45 directs flow from line 39 via line 46 to actuators 47, 48 and 79 holding valve 30 open and valves 45 and 49 in the position shown in FIG. 1a. Flow is directed through valve 49 to line 50 and from line 50 to lines 51 and 52 to actuators 53 and 54 such that vessel 1 is on the adsorption cycle, receiving influent gas from line 10, and vessel 2 is on the regeneration cycle with valve 30 open. Lines 55 and 56 are not connected to line 39, and so are depressurized, so that valve 28 is closed and valve 14 is open.

A snap-actuator 41 is connected to valve 38, and when the gas accumulator 36 has reached a predetermined minimum pressure, the snap-action pressure at which the snap-actuator 41 is actuated is reached, and shifts valve 38, directing gas now through line 37 and orifice 9, and starts charging gas accumulator 35. At the same time, pressure in line 37 trips actuator 57 and opens valve 58.

Figure 1B:
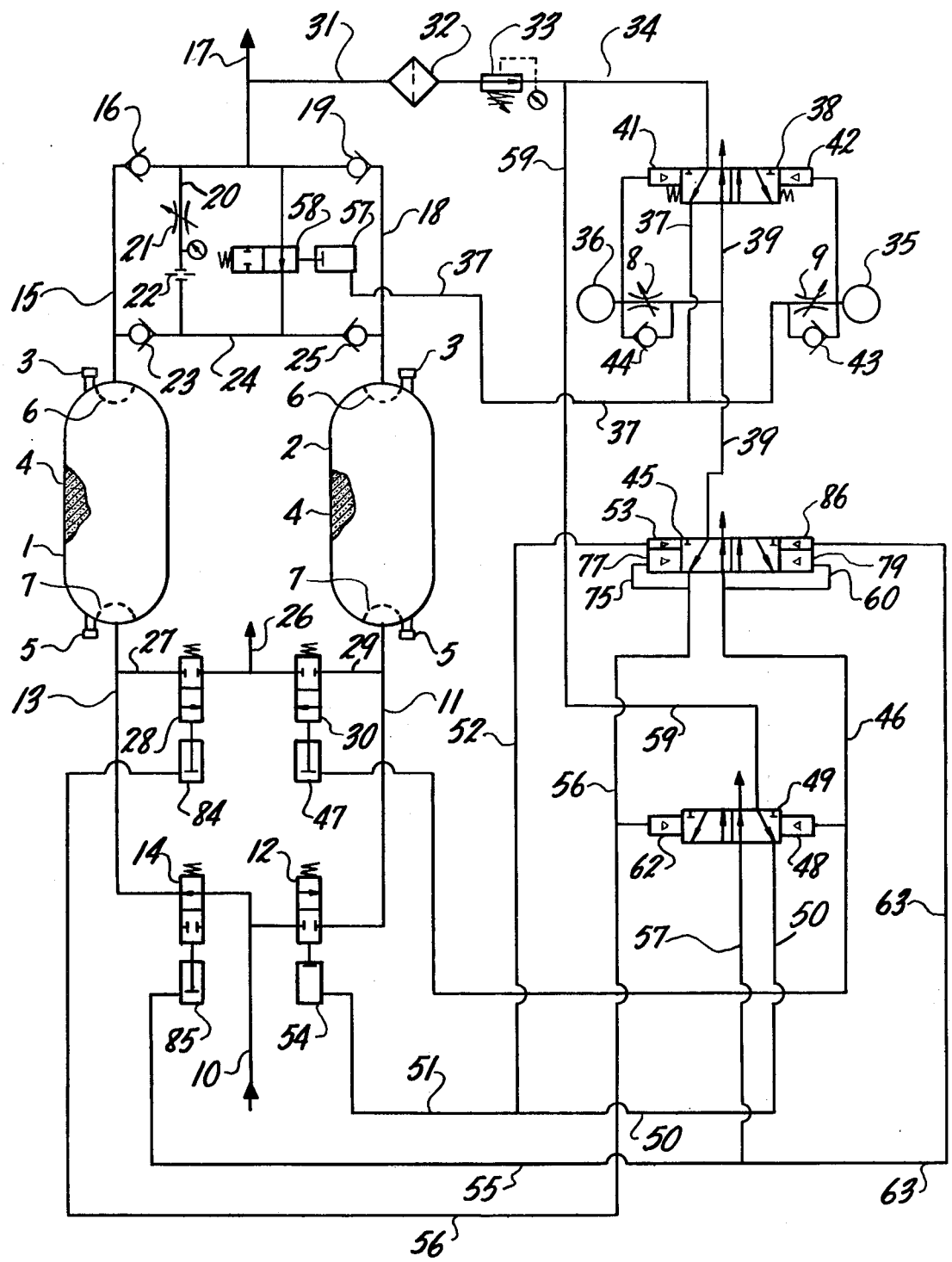
FIG. 1b shows the next stage of the adsorption cycle, with the left chamber still on-stream, and the right chamber regenerated and undergoing repressurization, to ready it for on-stream adsorption.

As shown in FIG. 1b line 59 extends from line 34 and is led through valve 49 to line 50 and through line 52 to actuator 53. Depressurization of line 60 through line 37 allows valve 45 to shift, depressurizing line 46, and allowing valve 30 to close. Vessel 2, which has been regenerated in this portion of the cycle, now enters the next portion of the cycle, and repressurized through valve 58; both vessels 1 and 2 are now at line pressure, with vessel 1 still on-stream.

This next portion of the cycle continued until the pressure in the gas accumulator 35 reaches the predetermined minimum actuation pressure of the snap-actuator 42, whereupon the valve 38 again shifts, directing gas flow now through the line 39. The third portion of the cycle now begins.

Figure 1C:
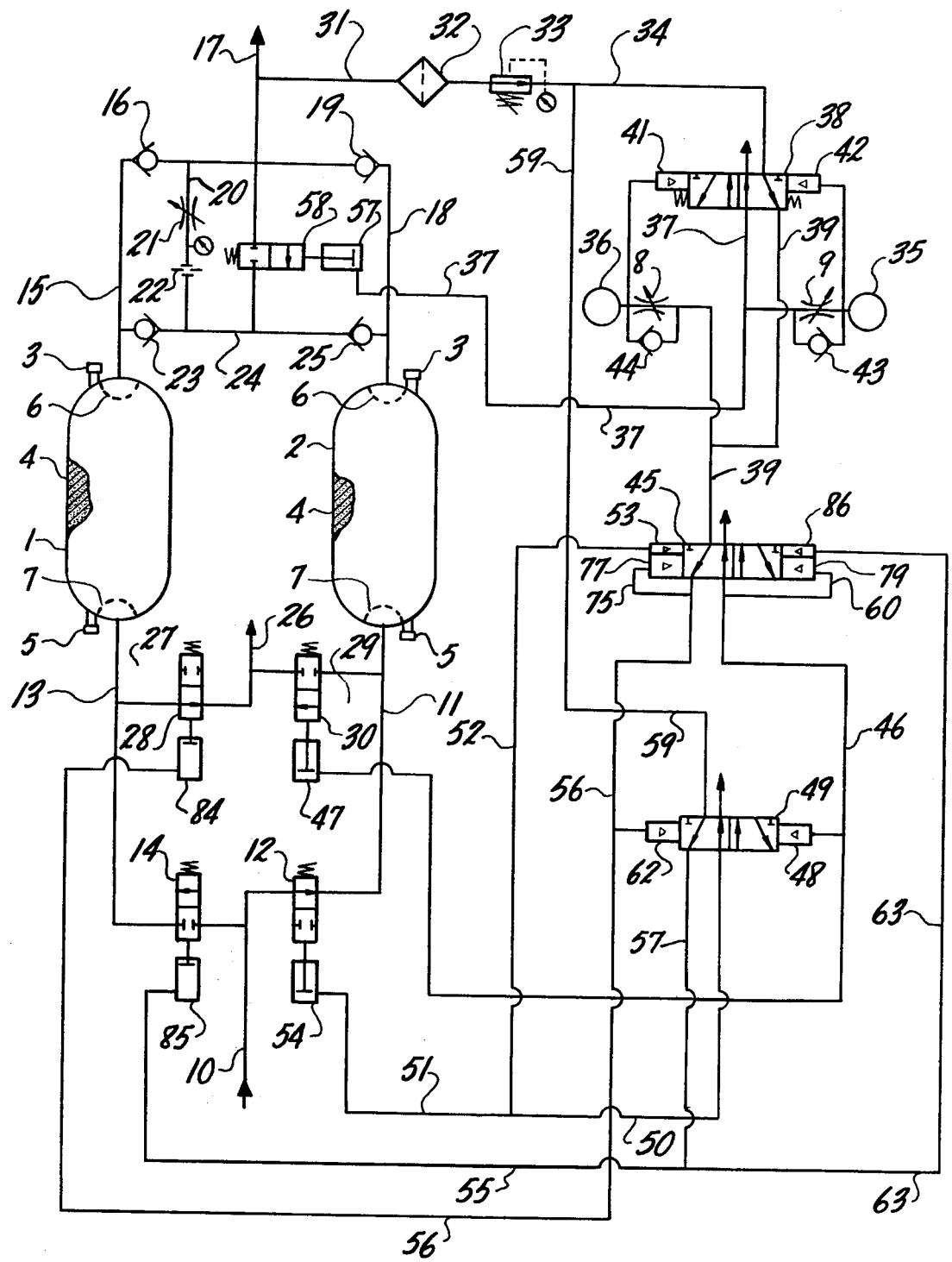
FIG. 1c shows the next stage of the adsorption cycle, with the left chamber now being regenerated and the right chamber onstream for adsorption.

As shown in FIG. 1c, the interconnection of lines 34 and 39 via valve 38 now pressurizes line 39 to valve 45. Inasmuch as valve 45 has shifted, so that now lines 56 and 39 are interconnected, valve 45 directs flow from line 39 via line 56 to actuators 84, 62, and 77, holding valve 28 open and valves 45 and 49 in the positions shown in FIG. 1c. Flow is directed through valve 49 to line 57 and from line 57 to lines 55 and 63 to actuators 86 and 85 such that vessel 2 is on the adsorption cycle, receiving influent gas from line 10 and vessel 1 is on the regenerator cycle with valve 28 open. Lines 46 and 50 are not connected to line 30 and so are depressurized, so that valve 29 is closed and valve 12 is open.

Figure 1D:
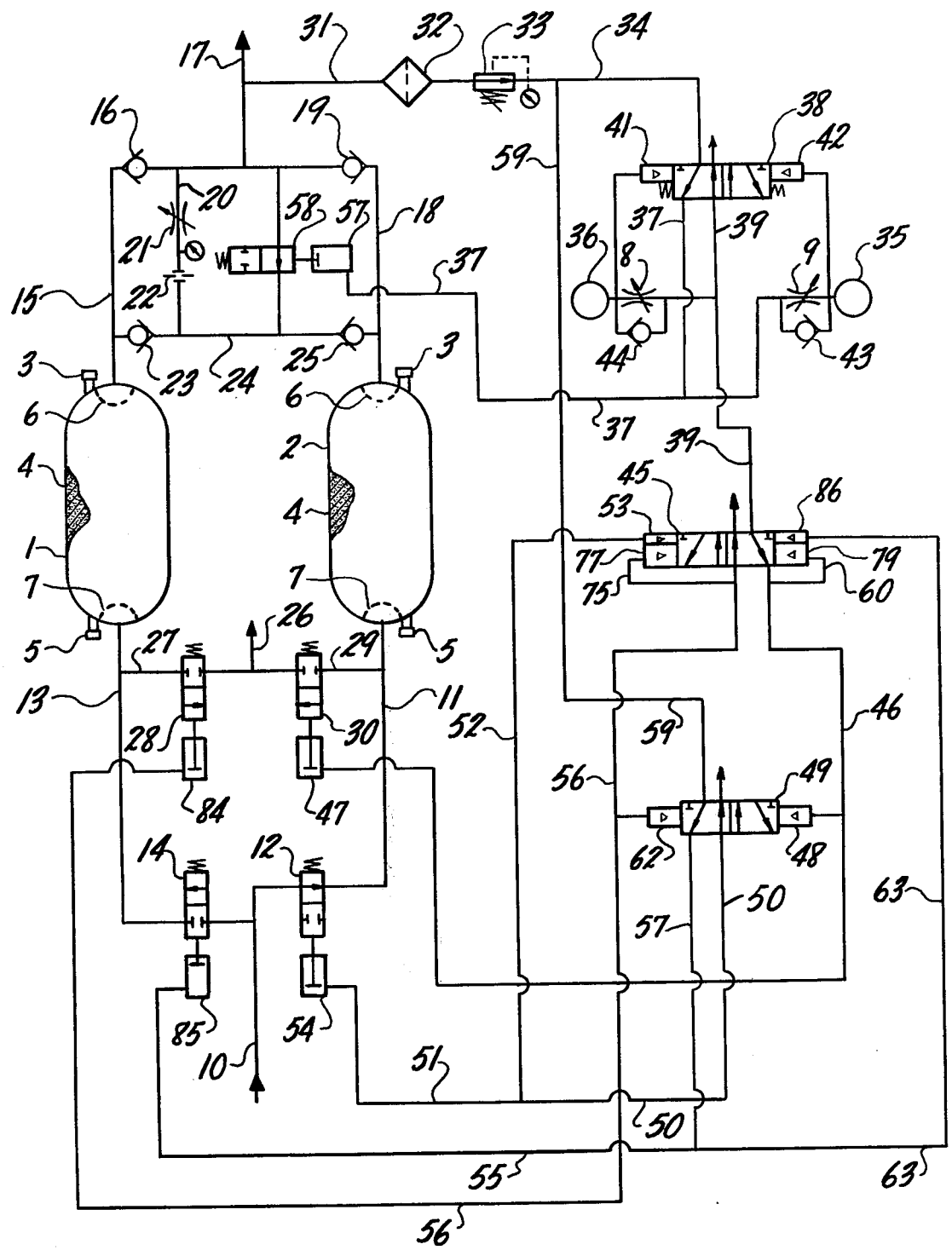
FIG. 1d shows the final stage of the adsorption cycle, with the right chamber still-on stream, and the left chamber now regenerated and undergoing repressurization, readying it for onstream adsorption in the first stage of the next cycle.

When the gas accumulator 36 has reached a predetermined minimum pressure, vessel 1 has been regenerated, so that snap-actuator 41 shifts valve 38, initiating the last portion of the cycle, as shown in FIG. 1d, and repressurization of vessel 1. Upon the shifting of valve 38 as accumulator 35 reaches the predetermined snap-action pressure, this cycle ends, and the next cycle begins.

Figure 2:
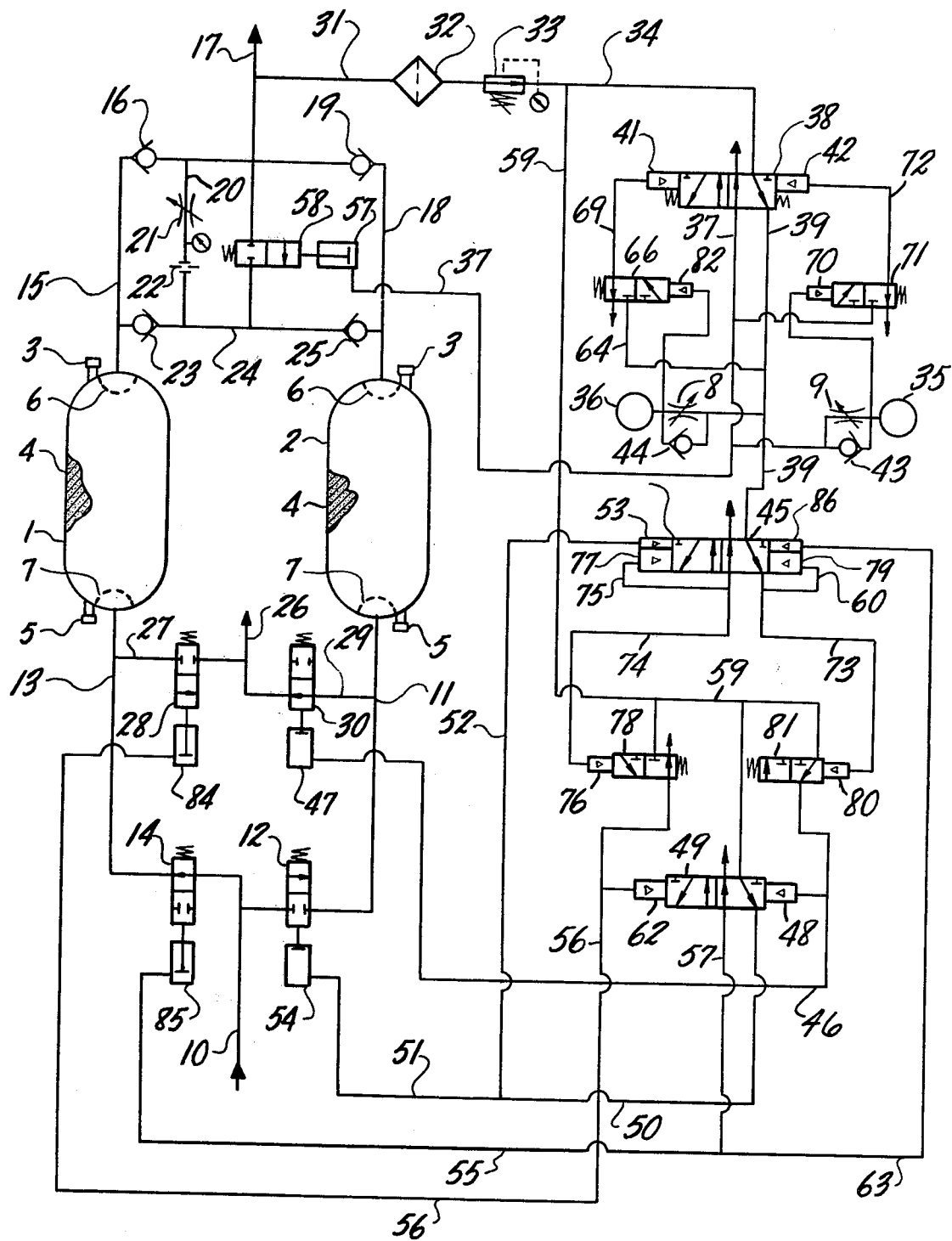
FIG. 2 is a schematic view of another embodiment of two-bed heatless gas fractionator in accordance with the invention, designed to accumulate effluent gas, and showing the fractionator in the first stage of the adsorption cycle with the left chamber on-stream for adsorption, and the right chamber being regenerated.

The dryer of FIG. 2 is also composed of a pair of desiccant tanks 1, 2 which are disposed vertically. Each tank contains a bed 4 of desiccant such as silica gel. Also provided in the tanks 1,2 are desiccant fill and drain ports 3,5, for draining or filling of desiccant in the tanks.

At the bottom of each vessel is a sorbent screen support 7 made of stainless steel mesh and/or perforated stainless steel sheet, retaining the sorbent bed 4 in the vessels 1,2.

At the top of each vessel at the outlet therefrom is filter screen 6, also made of stainless steel mesh and/or perforated sheet. This acts to retain any sorbent particles that might otherwise be carried out from the bed 4 to keep the outlet and the remainder of the system cleam of such particles.

An extensive system of lines is provided, connecting the two tanks for introduction of influent gas containing moisture to be removed and for delivery of dry effluent gas freed from moisture after having passed through the dryer, with the necessary valves for switching flow of influent and effluent gas to and from each tank. The gas from the inlet line 10 can flow to tank 1 through line 13, past valve 14, or to tank 2 via line 11 past valve 12. From tank 1 the effluent gas passes through line 15 past check valve 16 to the effluent line 17, and from tank 2 the effluent gas passes through line 18 past check valve 19 to the effluent line 17. The check valves 16, 19 prevent the effluent gas from entering the chamber which is being regenerated during the adsorption cycle.

A portion of the effluent gas flow is used for regeneration. For this purpose, line 20 is provided, leading past the pressure-reducing and flow-controlling valve 21 and orifice 22, whence the effluent gas can proceed to the tank 1 past check valve 23 via line 24, or to tank 2 past check valve 25 via line 24. The check valves 23, 25 prevent the higher pressure effluent gas during the adsorption cycle from by-passing to the other tank under regeneration. The purge gas after passing through the tank being regenerated is exhausted via the outlet line 26, passing from tank 1 through line 27 past two-way valve 28, or from tank 2 through line 29 past two-way valve 30.

A further portion of effluent gas is withdrawn in accordance with the invention to the gas accumulators 35, 36 for the purpose of timing the adsorption cycle by way of line 31. The line 31 is further sub-divided into lines 34 and 59, with effluent gas passing through each line at all times. Line 33 leads via pressure regulator 33 and filter 32 to the gas accumulators 35,36 via four-way valve 38, and thence by either line 37 or line 39, line 37 feeding gas accumulator 35 via orifice 9, an adjustable bleed valve, and line 39 feeding gas accumulator 36 via orifice 8, an adjustable bleed valve.

FIG. 2 shows the position of the valves in the gas accumulator system at the start of the adsorption cycle with tank 1 on-stream, and tank 2 of off-stream on the regeneration cycle.

The four-way valve 38 has two positions, in one position charging line 39 with gas flow from line 34 while line 37 is vented, and in the other position charging line 37 with gas flow from line 34 while line 39 is vented. The valve 38 is moved between these two positions by the snap-action actuators 41,42, of which actuator 42 is actuated at a predetermined pressure reached in gas accumulator 35 via valve 66 while actuator 41 is actuated at a predetermined pressure reached in gas accumulator 36 via valve 71.

The time required for gas accumulator 35 to reach the predetermined pressure is the time for conclusion of the adsorption cycle in the sorbent bed on-stream, and for repressurization of the sorbent bed which has been regenerated, before that bed is placed on-stream for adsorption. The time required for the gas accumulator 36 to reach the predetermined pressure is the time required for the first portion of the adsorption cycle in the sorbent bed on-stream, and for the regeneration of the sorbent bed which is off-stream.

With the valve 38 in the position shown in FIG. 2, flow is directed through line 39 and then via orifice 8 to gas accumulator 36. The time before valve 38 is switched is determined by the rate of gas flow through orifice 8 charging accumulator 36, until the predetermined snap-action pressure is reached at which snap-actuator 82 is triggered, whereupon valve 66 is shifted, directing gas from line 39 through lines 64 and 69 to snap-actuator 41, shifting valve 38.

Similarly, when the valve 38 is in this new position, directing flow from line 34 through line 37, the time required for the next shift of valve 38 back to the position shown in FIG. 2 is determined by the time required for gas accumulator 35 to be charged through orifice 9. When the predetermined pressure at which snap-actuator 70 is reached, the valve 71 is shifted by the actuator 70, putting the line 68 in flow connection with line 72, leading the snap-actuator 42, which then shifts the valve 38 to its first position.

With the valve 38 in the position shown in FIG. 2, gas pressure in line 39 is also directed to the four-way two-position valve 45, which is the first position, shown in the Figure, connects line 39 with line 73. In its other position, valve 45 connects line 39 with line 74.

A portion of the gas flow in line 74 is directed through line 75 to snap-actuator 77 holding valve 45 in position. The gas flow is directed through line 74 to snap-actuator 76 on valve 78.

A portion of the gas flow through line 73, as shown in FIG. 2, is directed through line 60 to snap-actuator 79, holding valve 45 in position, and gas flow through line 73 is directed to snap-actuator 80, shifting valve 81.

Line 59 also directs effluent gas flow from the line 34 to the influent gas/purge gas effluent switching system for the vessels 1,2, directing such flow to valves 78, 81 and 49. With valve 81 shifted, effluent gas through line 59 is directed to line 46, and there on to snap-actuator 48 and valve operator 47, opening valve 30 and connecting vessel 2 to purge gas vent line 26, and shifting four-way valve 49, respectively. Gas flow through valve 49 is directed from line 59 to line 50. Line 50 is divided into lines 51 and 52. Gas flow is directed through line 52 to snap-actuator 53, while line 51 directs a portion of the gas flow to valve actuator 54, closing valve 12, and disconnecting vessel 2 with the gas influent line 10.

With the valve 38 in the position shown in FIG. 2, gas accumulator 36 reaches eventually the actuation pressure of snap-actuator 82, shifting valve 66 and directing gas flow through line 69 to the snap-actuator 41, shifting valve 38. When valve 38 shifts, line 39 is vented and depressurized, exhausting lines 73 and 60. Thereupon, valve 81 shifts, exhausting line 46, and allowing valve 30 to close. Loss of pressure in line 60 depressurizes actuator 79, allowing valve 45 to shift, inasmuch as pressure is maintained at actuator 53 via lines 52 and 59 through valve 49. The shifting of valve 38 directs gas pressure through line 37 to actuator 57, opening valve 58, and allowing the off-stream chamber 2 to repressurize, since purge effluent valve 30 is now closed.

With line 37 now in connection with line 34, the gas accumulator 35 takes over the tasks of controlling the duration of this portion of the adsorption cycle. When volume 35 reaches the snap-pressure of actuator 70, valve 71 shifts, directing gas flow through line 72 to snap-actuator 42, shifting valve 38, exhausting line 37 and actuator 57, and allowing valve 58 to close. Repressurization being complete, the regenerated bed 2 is now ready to be put on-stream.

The interconnection of lines 34 and 39 via valve 38 now pressurizes line 39 to valve 45. Inasmuch as valve 45 has shifted, so that now lines 74 and 39 are interconnected, gas flow is directed through the valve to line 74 and to actuator 76, shifting valve 78. This interconnects lines 59 and 56, and gas pressure now pressurizes the actuator 62 to shift valve 49 and depressurizing lines 50, 51 and 52. Gas through line 56 causes actuator 84 to open purge effluent valve 28, putting bed 1 in connection with purge vent line 26, and preparing bed 1 for regeneration. Effluent gas directed through valve 49 is directed through line 57 to line 55 to actuator 85, closing the valve 14, and cutting off flow to bed 1 from influent line 10. Gas flow off line 55 is directed to actuator 86 through line 63, and through line 75 to actuator 77, maintaining valve 45 in this position.

Inasmuch as line 50 is exhausted, through the break in the connection with line 59, lines 51 and 52 are depressurized; actuators 53 and 54 are deactivated, allowing valve 12 to open. Bed 2 is now put in connection with influent line 10 and goes on-stream, for adsorption, while bed 1 is put on the regeneration cycle, the duration of the first portion of which is timed by the time required for the gas accumulator 36 to reach the actuation pressure at which valve 38 is switched, and the cycle is then repeated for the next portion of the adsorption cycle on bed 2.

Figure 3:
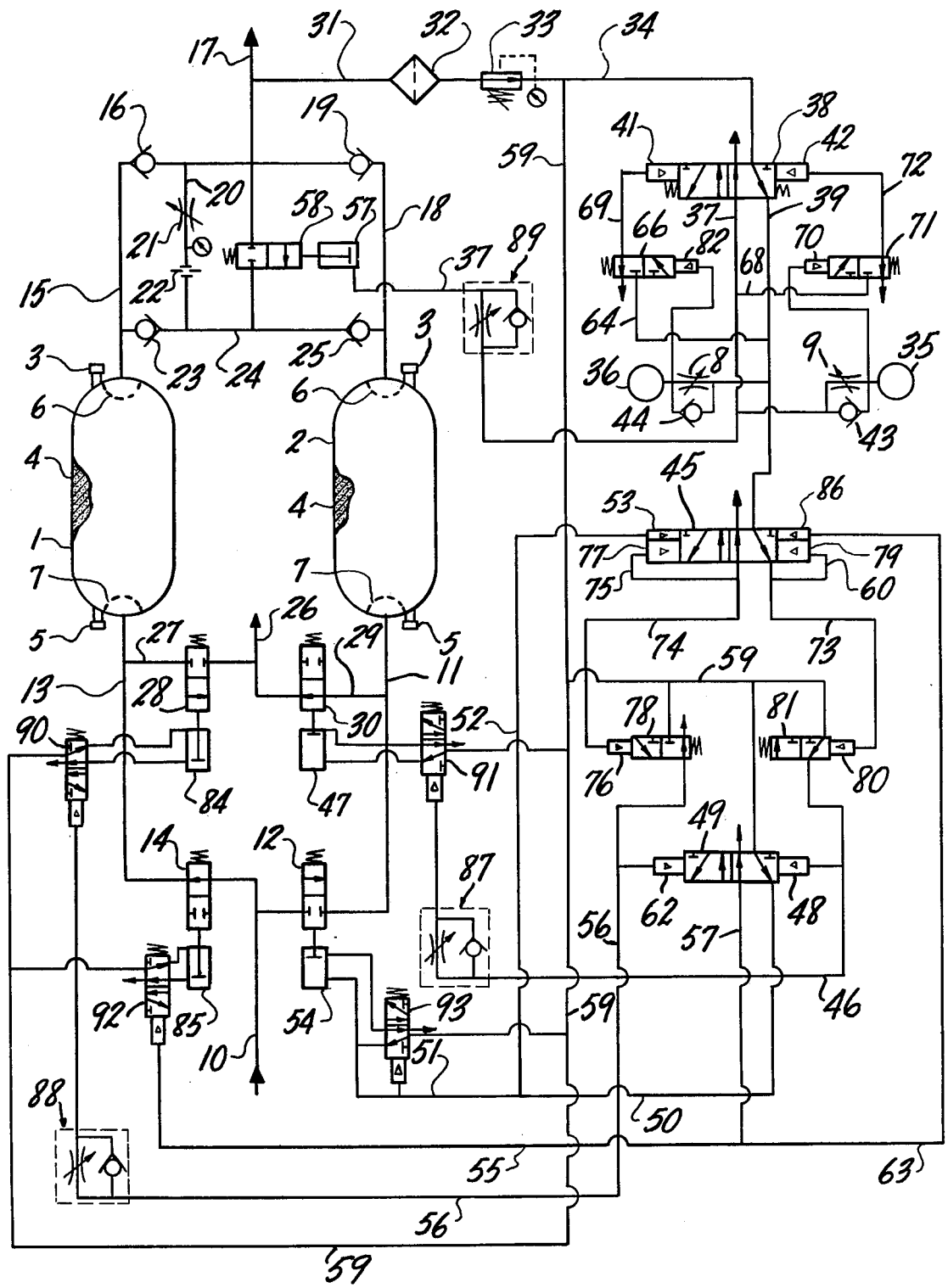
FIG. 3 is a schematic view of a further embodiment of two-bed heatless gas fractionator in accordance with the invention, designed to accumulate effluent gas, and showing the fractionator in the first stage of the adsorption cycle, with the left chamber on-stream for adsorption, and the right chamber being regenerated.

FIG. 3 shows another embodiment of heatless dryer similar to that of FIG. 1 with the addition of flow control valve 87 in line 46, flow control valve 88 in line 56, and flow control valve 89 in line 37, each operated from lines 46, 56 and 37, respectively, and four four-way interface valves 90, 91, 92 and 93 in line 59.

The actuation time of the valves 28,30 and 58 is delayed after the pressurization of lines 37, 46 or 56 by the time delay imposed by the flow control valves 87, 88 and 89. Thus, when the valves 78 and 81 as described in conjunction with FIG. 2 are switched, the gas pressure is delayed to the actuators 84 and 47, delaying the opening of the valves 28 and 30, and allowing for the complete switching of the inlet valves 14 and 12 prior to the opening of either of valves 28 or 30. Consequently, neither tank 1 nor tank 2 is exhausted to atmosphere before the valves 14 or 12 are switched.

When the valve 38 switches, as described in conjunction with the apparatus of FIG. 2 and line 37 is pressurized, the gas pressure is relayed to the valve actuator 57 through flow control valve 89, delaying the opening of valve 58 to allow time for exhaust valves 28 or 30 to completely close.

Figure 4:
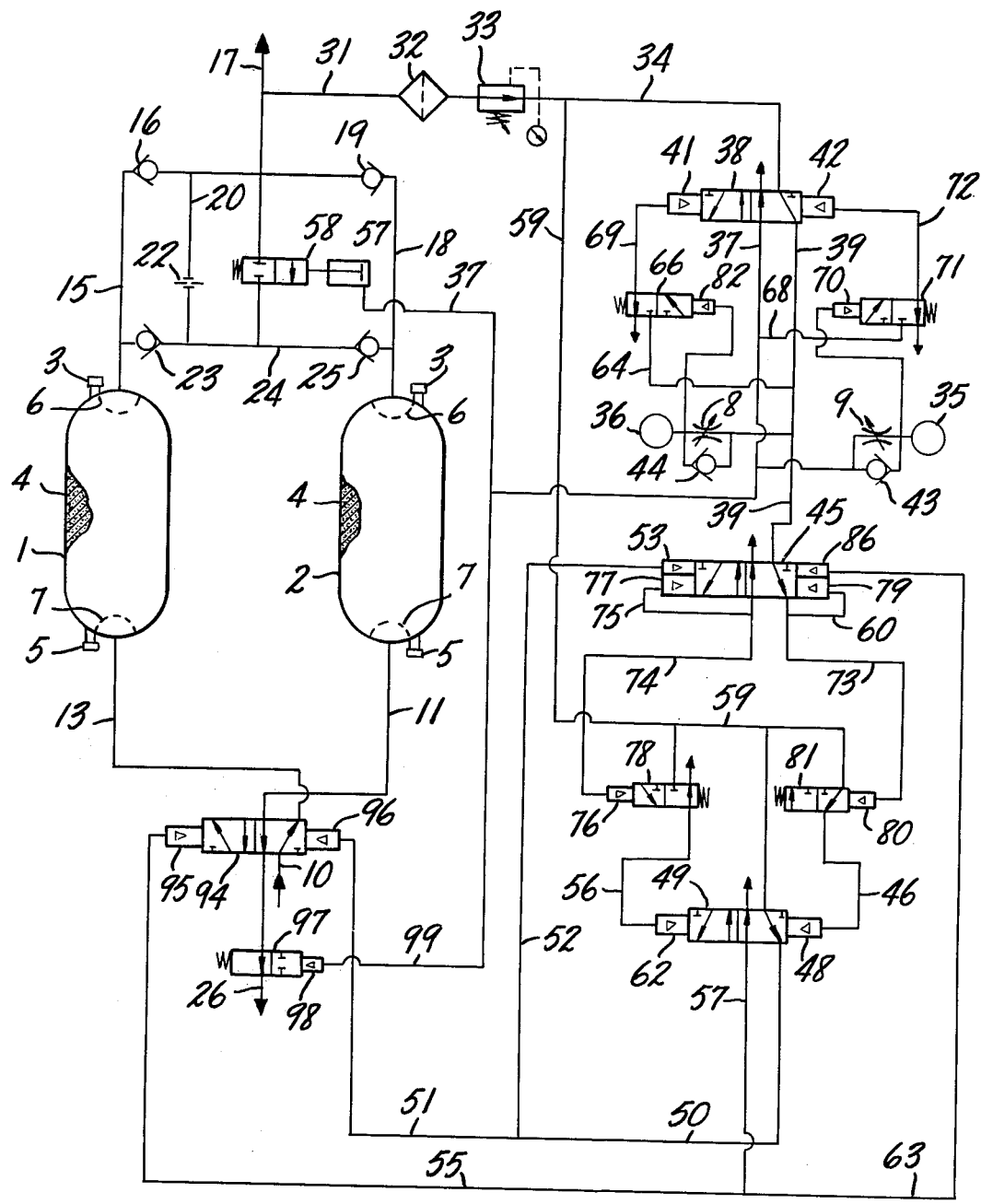
FIG. 4 is a schematic view of a further embodiment of two-bed heatless gas fractionator in accordance with the invention, designed to accumulate effluent gas, and showing the fractionator in the first stage of the adsorption cycle, with the left chamber onstream for adsorption, and the right chamber being regenerated.

In the embodiment shown in FIG. 4, the arrangement is also similar to that of FIG. 2, with the exception that the influent gas from line 10 is directed through a four-way five-ported two-position valve 94, whose position is controlled by actuators 95 and 96.

The effluent gas is directed to line 17 from tanks 1, 2 via check valves 16, 19, respectively. The purge gas for regeneration is directed by line 20 through the orifice 22 and thence through either check valve 23 or 25 to the chamber which is on the regeneration cycle. The regenerating purge gas exhausts from the chamber being regenerated through the valve 94, and a two-way normally open exhaust valve 97, and thence is dumped through the line 26 to the atmosphere.

As in the embodiment of FIGS. 2 and 3, a portion of effluent gas is removed from the line 17 by way of the lines 31, 34 and 59 to control the cycling. Line 31 is directed through pressure regulator 33 and filter 32 and the four-way dual snap-actuated valve 38 to the gas accumulators 35, 36 through bleed valves 9, 8, respectively, by lines 37, 39, respectively. The valve 38 changes position when a pressure is achieved in the gas accumulator 35 or 36 sufficient to operate the actuators 70 or 82. The check valves 44, 43 provide rapid exhaust of the gas accumulators when valves 71,66 are open.

When the valve 38 directs gas pressure to line 37, regeneration exhaust valve 97 is held closed, allowing the repressurization of the regenerating chamber by means of the orifice 22 and/or valve 58. The inlet switching valve 94 is operated as valves 14 and 12 as described in conjunction with FIG. 2.

Figure 5:
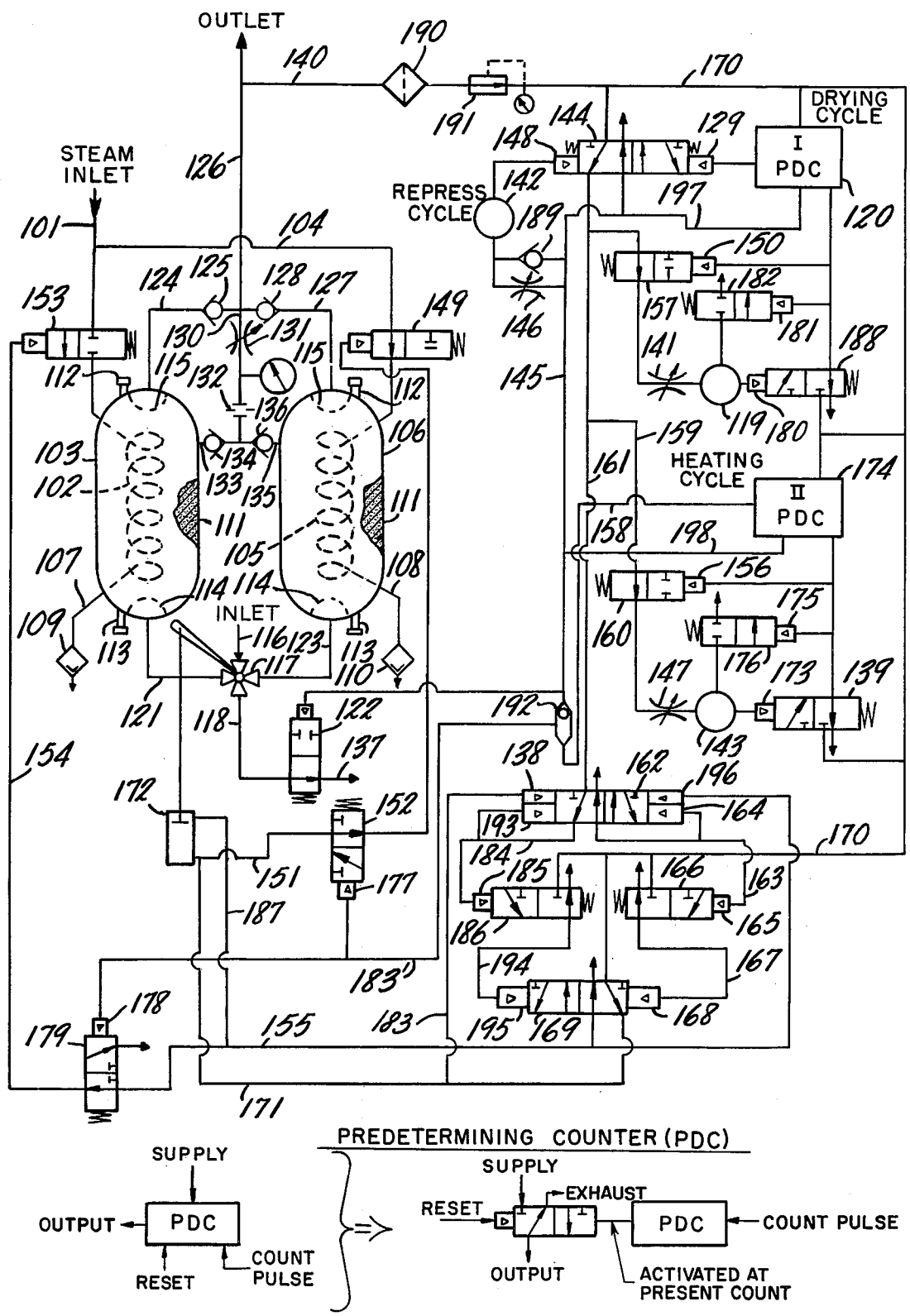
FIG. 5 is a schematic view of a two-bed heat-reactivatable gas fractionator in accordance with the invention, designed to accumulate effluent gas, and showing the fractionator in the first stage of the adsorption cycle, with the left chamber on-stream for adsorption, and the right chamber being regenerated.

The dryer of FIG. 5 is designed to regenerate a spent desiccant bed by a heated effluent gas purge. For this purpose, a steam generator (not shown) is provided, connected by a line 101 with a heating coil 102 in vessel 103 and then connected by a line 104 to a heating coil 105 in vessel 106 and then via either lines 107 or 108 to steam traps either 109 or 110.

The dryer is composed of a pair of sorbent vessels 103, 106 which are disposed vertically. Each vessel contains a bed of sorbent 111, such as silica gel. Also provided in the vessels are sorbent fill and drain ports 112, 113 for draining or filling of sorbent in the vessels. At the bottom of each vessel is a sorbent support 114, made of perforated stainless steel sheet, and at the top of the vessel at the outlet therefrom is a filter screen 115, which may be removable, and is made of stainless steel wire mesh or perforated stainless steel sheet. These screens retain sorbent particles which might otherwise be carried out from the vessels when the vessels are on-stream, and keep the remainder of the system clean of such particles.

The system includes an inlet line 116 leading to a four-way valve 117, switched by actuator 172 which is actuated when a predetermined number of volumes of gas has been accumulated and dumped from the gas accumulator 119, as counted by the predetermining counter 120, which is arranged to trigger the snap-action actuator 121 when the preset count total in the predetermining counter has been reached.

The four-way valve 117 controls the flow of influent gas to one of the vessels 103, 106 and directs purge flow from the other vessel to the pneumatically actuated purge exhaust valve 122. The gas from the inlet line 116 can flow to vessel 103 through line 121, or to vessel 106 via line 123. From vessel 103, the effluent gas passes through line 124 past check valve 125 to the effluent line 126, and from vessel 106 the effluent gas passes through line 127 past check valve 128 to the effluent line 126. The check valves 125, 128 prevent the effluent gas from entering the other vessel which is being regenerated while the first vessel is on stream, for adsorption.

A portion of the effluent gas flow is used for regeneration. For this purpose line 130 is provided, leading past the pressure-reducing and flow-controlling valve 131 and orifice 132, whence the effluent gas can proceed to the vessel 103 via line 133, past check valve 134, directly into the tank 103, or to tank 106 via line 135, past check valve 136. The check valves 134, 136 prevent the higher pressure effluent gas while the vessel is on-stream for adsorption from by-passing to the other vessel under regeneration. The purge gas, after passing through the vessel being regenerated, is exhausted via the outlet line 137 passing through vessel 103, through lines 121, 118 past the other side of four-way valve 117 or from tank 106 through lines 123, 118, past the other side of four-way valve 117.

A further portion of effluent gas is withdrawn by way of line 140 in accordance with the invention, and led via an orifice 141 controlling feed rate into a gas accumulator 19 for the purpose of controlling the duration of the adsorption cycle. The line 140 leads to three gas accumulators, 119, 142 and 143, according to the position of the four-way valve 144.

In the position shown in FIG. 5, the system is arranged for vessel 103 on-stream for adsorption and vessel 106 being regenerated. The valve 144 in this position feeds via line 145 the gas accumulator 142 on the other side of the orifice 146, in this case an adjustable bleed valve, and in the other position feeding both the gas accumulator 119 and the gas accumulator 143 on the other side of the orifices 141, 147, respectively, in these cases also adjustable bleed valves.

The four-way valve 144 is switched by snap-action actuators 148 and 121 which are actuated when a predetermined minimum gas pressure or number of counts, as for actuator 121, is reached. When a predetermined minimum gas pressure in the gas accumulator 142 is reached the actuator 148 is triggered, shifting valve 144. On the other side, snap-actuator 121 is triggered by the output pulse from the predetermining counter 120.

As shown in FIG. 5 at the start of an adsorption cycle, with the vessel 103 on-stream, the four-way valve 117 is in the position shown in FIG. 5, directing inlet flow via line 121 to the vessel 103. Effluent gas from the vessel proceeds via line 124 past check valve 125 to the outlet line 126.

A portion of the effluent gas flow passes through check valve 136 and then through vessel 106 for regeneration, emerging via line 123 past the four-way valve 117 on the other side, and then via line 118 past the valve 122 to the exhaust line 137 where it is vented to the atmosphere.

Steam shut-off valve 149 is open, being actuated through line 150 and 151 via valve 152, and stream valve 153 is closed as lines 154 and 155 are depressurized. Thus, the right hand vessel 106 is being heated on purge while the left hand vessel 103 is on-stream, on the adsorption cycle, drying the process gas.

A further portion of the effluent gas from line 126 passes through line 140 via filter 190 and pressure regulator 191, to the four-way valve 144 which then is in a position to direct flow through line 156 past the snap-actuated valve 157 and orifice 141 into the first volume 119 and through lines 158 and 159, past snap-actuated valve 160 and orifice 147 into the second volume 143.

A portion of gas is also directed through line 161 and directed through valve 162 to line 163, where a portion thereof is directed to actuator 164, maintaining valve 162 in place. Further on, line 163 causes actuator 165 to shift valve 166 such that gas is directed through line 167 to actuator 168, shifting valve 169 and thereby connecting gas effluent line 170 to line 171 causing actuator 172 to move valve 177 to the position shown in FIG. 5.

A snap-actuator 173 is connected to the volume 143 and when a predetermined volume has been accumulated, a predetermined minimum gas pressure is reached, at which time the snap-actuator 173 is actuated. This signals the predetermining counter 174 which counts the pulse and at the same time actuates the snap-actuator 175 for valve 176. This dumps the volume 143 quickly and then closes, whereupon the volume refills through the orifice 147. Refilling continues to the predetermined minimum pressure at which the snap-actuator 173 is actuated and this again signals the predetermining counter 174, which counts another pulse. This operation continues until the predetermining counter has counted the number of pulses determined in advance which correspond to the length of the heated regeneration cycle. When this number has been counted, the predetermining counter actuates the pneumatic actuators 177 and 178 of valves 152 and 179, respectively. Actuation of valves 152 and 179 vents lines 150 and 154, allowing steam valves 153 and 149 to close, thus terminating the heating cycle. Purge flow continues through orifice 132 and lines 131 and 135 through the vessel 106, cooling the desiccant bed (and structure) in preparation for switching the drying flow to that vessel.

At the same time that predetermining counter 174 starts counting fill-dump cycles, so does predetermining counter 120. Predetermining counter 120 has a cycle time equal to that needed to heat regenerate the off-stream vessel plus the time needed to heat regenerate the off-stream vessel plus the time needed to cool the off-stream cycle. This sum is equal to the drying cycle less the time for pressurization of the off-stream vessel.

A snap-actuator 180 is connected to the volume 119, and when a predetermined volume has been accumulated, a predetermined minimum gas pressure is reached, at which the snap-actuator 180 is actuated. This signals the predetermining counter 120, which counts the pulse and at the same time actuates the snap-actuator 181 for valve 182. This dumps the volume quickly and then closes, whereupon the volume refills through the orifice 141. Refilling continues to the predetermined minimum pressure at which the snap-actuator 180 is actuated, and this again signals the predetermining counter 120, which counts another pulse. This operation continues until the predetermining counter has counted the number of pulses determined in advance, which corresponds to the length of a drying cycle. When this number has been counted, the predetermining counter actuates the snap-actuator 121 shifting the valve 144 and putting the line 170 in connection with the line 145 for the repressurization cycle.

This shifting of valve 144 also vents lines 156, 161 and 159. The venting of line 161 allows for the venting of line 163 through valve 162. This depressurizes actuator 164, allowing valve 162 to shift, as pressure is maintained on actuator 182 through line 183 off line 171. Effluent gas off line 145 closes valve 122 allowing vessel 106 to pressurize through orifice 131 and check valve 136, while also closing both steam valves 149 and 153, with gas flow through shuttle valve 192 activating both valves 152 and 179. Another portion of gas off line 145 passes through lines 197 and 198 for resetting predetermining counters 120 and 174, respectively.

Effluent gas now passes through the orifice 146 into volume 142 where the gas accumulates until a predetermined actuating pressure for the snap-actuator 148 of four-way valve 144 is reached, whereupon the valve again shifts, once again connecting the effluent gas line 140 with line 156. Line 145 depressurizes allowing purge shut-off valve 122 to open and steam valves 149 and 153 to close. Now however the valve 162 has shifted, and line 161 is led to line 184 and thusly to actuators 185 and 193, causing valve 186 to shift, with actuator 193 holding valve 162 is place. Valve 186 having shifted connects lines 170 and 194 causing valve 169 to shift as actuator 195 is activated.

Line 171 is now vented through valve 169 and line 155 is pressurized through valve 169 and thereby from line 170. Actuator 196 is pressurized off line 155. Actuator 172 is pressurized through lines 155 and 187, shifting valve 117 and directing inlet flow through valve 117 and line 123 to vessel 106. Steam valve 153 is shifted open by gas flow from line 154 through valve 179 from line 155. The right vessel 106 is on-stream, on the adsorption cycle, for drying, and the left vessel 103 is off-stream being regenerated.

Accordingly, effluent gas flow proceeds past the four-way valve 144 through lines 156, 158 and 159, past snap-actuated valves 157 and 160, and orifices 141 and 147 into volumes 119 and 143, and accumulates until a predetermined minimum pressure at which snap-actuators 180 and 173 are actuated is reached. This sends a pulse to the predetermining counters 120, 174 which sends a pulse to the valves 182 and 176, opening the valves, and dumping the volume. These valves close, and gas once again begins accumulating in the respective volumes. When the predetermined actuating pressure for the snap-actuators 180, 173 are reached, another pulse is sent to the predetermining counters 120, 174, and this continues until the preset count has been reached. This is reached first on predetermining counter 174, terminating the heating cycle, and second on predetermining counter 120, initiating repressurization, both as earlier described, and starting the cycle over again.

The gas fractionator of FIG. 6 is composed of a pair of sorbent vessels 1, 2, which are disposed vertically. Each vessel contains a bed of sorbent 4, such as silica gel. Also provided in the vessels 1, 2 are sorbent fill and drain ports 3, 5 for draining or filling of sorgent in the vessels.

At the bottom of each vessel is a sorbent support 7 made of perforated stainless steel sheet, retaining the sorbent bed 4 in the vessels 1, 2.

At the top and bottom of each vessel at the outlet therefrom is a filter screen 6, 6', which may be removable and is made of sintered stainless wire mesh or perforated stainless steel sheet. This acts to retain any sorbent particles that might otherwise be carried out from the bed 4 to keep the outlet lines and the remainder of the system clean of such particles.

An extensive system of lines is provided, connecting the two vessels for introduction of influent gas containing a first gas to be removed, and for delivery of effluent gas freed from the gas after having passed through the sorbent bed in one of the two vessels, with the necessary valves for switching flow of influent and effluent gas to and from each vessel.

This system includes an inlet line 10. The gas from the inlet line 10 can flow to vessel 1 through line 13 past valve 14, or to vessel 2 via line 11 past valve 12. From vessel 1, the effluent gas passes through line 15 past check valve 16 to the effluent line 17, and from vessel 2 the effluent gas passes through the line 18 past check valve 19 to the effluent line 17. The check valves 16, 19 prevent the effluent gas from entering the other vessel which is being regenerated while the first vessel is on stream for adsorption.

A portion of the effluent gas flow is used for regeneration. For this purpose, line 20 is provided leading past the pressure-reducing and flow-controlling valve 21 and orifice 22, whence the effluent gas can proceed to the vessel 1 via line 24, past check valve 23, or to tank 2 via lines 24, 18 past check valve 25. The check valves 23, 25 prevent the higher pressure effluent gas while one vessel is on-stream for adsorption from bypassing to the other vessel under regeneration. The purge gas after passing through the vessel being regenerated is exhausted via the outlet line 26, passing from vessel 1 through lines 13, 27 past two-way valve 28, or from tank 2 through lines 11, 29 past two-way valve 30.

A portion of influent gas is withdrawn by way of line 31', in accordance with the invention, and led through the filter 32 and pressure regulator 33' and then via line 34' and an orifice controlling feed rate into a gas accumulator, for the purpose of controlling the duration of the adsorption cycle. The line 34' leads to the gas accumulators 35' or 36' according to the position of four-way valve 38', the valve in one position via line 37' feeding gas accumulator 35' on the other side of orifice 9', in this case an adjustable bleed valve, and in the other position via line 39' feeding an accumulator 36' on the other side of orifice 8', also an adjustable bleed valve.

The four-way valve 38' is switched by snap-action actuators 42', 41', which are actuated when a predetermined minimum gas pressure in gas accumulators 35', 36', respectively, is reached, and actuators 42', 41' are triggered respectively.

The check valves 43', 44' provide rapid exhaust of accumulators 35', 36' to lines 37', 39' when valve 38' shifts.

At the start of an adsorption cycle, with vessel 1 on stream, the valves 38' and 45' are in the position shown in FIG. 6, valve 38' directing the gas flow from line 34' to line 39' and then through orifice 8' to gas accumulator 36'. A portion of gas effluent is thus accumulated, in the volume 36'.

Valve 45 directs flow from line 39' via line 46 to actuators 47, 48 and 79 holding valve 30 open and valves 45 and 49 in the position shown in FIG. 6. Flow is directed through valve 49 to line 50 and from line 50 to lines 51 and 52 to actuators 53 and 54 such that vessel 1 is on the adsorption cycle, receiving influent gas from line 10, and vessel 2 is on the regeneration cycle with valve 30 open. Lines 55 and 56 are not connected to line 39', and so are depressurized, so that valve 28 is closed and valve 14 is open.

A snap-actuator 41' is connected to valve 38' and when the gas accumulator 36' has reached a predetermined minimum pressure, the snap-action pressure at which the snap-actuator 41' is actuated is reached, and shifts valve 38', directing gas now through line 37' and orifice 9', and starts charging gas accumulator 35'. At the same time, pressure in line 37' trips actuator 57 and opens valve 58.

As shown in FIG. 6 line 59 extends from line 34' and is led through valve 49 to line 50 and through line 52 to actuator 53. Depressurization of line 60 through line 37 allows valve 45 to shift, depressurizing line 46, and allowing valve 30 to close. Vessel 2, which has been regenerated in this portion of the cycle, now enters the next portion of the cycle, and repressurizes through valve 58; both vessels 1 and 2 are now at line pressure, with vessel 1 still on-stream.

This next portion of the cycle continues until the pressure in the gas accumulator 35' reaches the predetermined minimum actuation pressure of the snap-actuator 42', whereupon the valve 38' again shifts, directing gas flow now through the line 39'. The third portion of the cycle now begins.

As shown in FIG. 1c (in this respect the systems of FIGS. 6 and 1c are the same), the interconnection of lines 34' and 39' via valve 38' now pressurizes line 39' to valve 45. Inasmuch as valve 45 has shifted, so that now lines 56 and 39' are interconnected, valve 45 directs flow from line 39' via line 56 to actuators 84, 62, and 77, holding valve 28 open and valves 45 and 49 in the positions shown in FIG. 1c. Flow is directed through valve 49 to line 57 and from line 57 to lines 55 and 63 to actuators 86 and 85 such that vessel 2 is on the adsorption cycle, receiving influent gas from line 10 and vessel 1 is on the regeneration cycle with valve 28 open. Lines 46 and 50 are not connected to line 39' and so are depressurized, so that valve 29 is closed and valve 12 is open.

When the gas accumulator 36' has reached a predetermined minimum pressure, vessel 1 has been regenerated, so the snap-actuator 41' shifts valve 38' initiating the last portion of the cycle, as shown in FIG. 1d (here also the systems of FIGS. 6 and 1d are the same) and repressurization of vessel 1. Upon the shifting of valve 38' as accumulator 35' reaches the predetermined snap-action pressure, this cycle ends, and the next cycle begins.

The dryer of FIG. 7, like that of FIG. 5, is designed to regenerate a spent desiccant bed by a heated effluent gas purge. For this purpose, a steam generator (not shown) is provided, connected by a line 101 with a heating coil 102 in vessel 103 and then connected by a line 104 to a heating coil 105 in vessel 106 and then via either lines 107 or 108 to steam traps either 109 or 110.

The dryer is composed of a pair of sorbent vessels 103, 106 which are disposed vertically. Each vessel contains a bed of sorbent 111, such as silica gel. Also provided in the vessels are sorbent fill and drain ports 112, 113 for draining or filling of sorbent in the vessels. At the bottom of each vessel is a sorbent support 114, made of perforated stainless steel sheet, and at the top of the vessel at the outlet therefrom is a filter screen 115, which may be removable, and is made of stainless steel wire mesh or perforated stainless steel sheet. These screens retain sorbent particles which might otherwise be carried out from the vessels when the vessels are on-stream, and keep the remainder of the system clean of such particles.

The system includes an inlet line 116 leading to a four-way valve 117, switched by actuator 172 which is actuated when a predetermined number of volumes of gas has been accumulated and dumped from the gas accumulator 119', as counted by the predetermining counter 120, which is arranged to trigger the snap-action actuator 121 when the preset count total in the predetermining counter has been reached.

The four-way valve 117 controls the flow of influent gas to one of the vessels 103, 106 and directs purge flow from the other vessel to the pneumatically actuated purge exhaust valve 122. The gas from the inlet line 116 can flow to vessel 103 through line 121, or to vessel 106 via line 123. From vessel 103, the effluent gas passes through line 124 past check valve 125 to the effluent line 126, and from vessel 106 the effluent gas passes through line 127 past check valve 128 to the effluent line 126. The check valves 125, 128 prevent the effluent gas from entering the other vessel which is being regenerated while the first vessel is on stream, for adsorption.

A portion of the effluent gas flow is used for regeneration. For this purpose line 130 is provided, leading past the pressure-reducing and flow-controlling valve 131 and orifice 132, whence the effluent gas can proceed to the vessel 103 via line 133, past check valve 134, directly into the tank 103, or to tank 106 via line 135, past check valve 136. The check valves 134, 136 prevent the higher pressure effluent gas while the vessel is on-stream for adsorption from by-passing to the other vessel under regeneration. The purge gas, after passing through the vessel being regenerated, is exhausted via the outline line 137 passing through vessel 103, through lines 121, 118 past the other side of four-way valve 117 or from tank 106 through lines 123, 118, past the other side of four-way valve 117.

A portion of influent gas is withdrawn from line 116 by way of line 140', in accordance with the invention, and led via an orifice 141' controlling feed rate into a gas accumulator 119' for the purpose of controlling the duration of the adsorption cycle. The line 140' leads to three gas accumulators, 119', 142' and 143', according to the position of the four-way valve 144'.

In the position shown in FIG. 7, the system is arranged for vessel 103 on-stream for adsorption and vessel 106 being regenerated. The valve 144' in this position feeds via line 145' the gas accumulator 142' on the other side of the orifice 146', in this case an adjustable bleed valve, and in the other position feeding both the gas accumulator 119' and the gas accumulator 143' on the other side of the orifices 141', 147', respectively, in these cases also adjustable bleed valves.

The four-way valve 144' is switched by snap-action actuators 148' and 129' which are actuated when a predetermined minimum gas pressure or number of counts, as for actuator 129', is reached. When a predetermined minimum gas pressure in the gas accumulator 142' is reached the actuator 148' is triggered, shifting valve 144'. On the other side, snap-actuator 129' is triggered by the output pulse from the predetermining counter 120'.

As shown in FIG. 7 at the start of an adsorption cycle, with the vessel 103 on-stream, the four-way valve 117 is in the position shown in FIG. 7, directing inlet flow via line 121 to the vessel 103. Effluent gas from the vessel proceeds via line 124 past check valve 125 to the outlet line 126.

A portion of the effluent gas flow passes through check valve 136 and then through vessel 106 for regeneration, emerging via line 123 past the four-way valve 117 on the other side, and then via line 118 past the valve 122 to the exhaust line 137 where it is vented to the atmosphere.

Steam shut-off valve 149 is open, being actuated through lines 150 and 151 via valve 152, and steam valve 153 is closed as lines 154 and 155 are depressurized. Thus, the right hand vessel 106 is being heated on purge while the left hand vessel 103 is on-stream, on the adsorption cycle, drying the process gas.

A portion of the influent gas from line 116 passes through line 140' via filter 190' and pressure regulator 191' to the four-way valve 144', which then is in a position to direct flow through line 156' past the snap-actuated valve 157' and orifice 141' into the first volume 119' and through lines 158' and 159', past snap-actuated valve 160' and orifice 147' into the second volume 143'.

A portion of influent gas in line 170' is also directed through line 161 and directed through valve 162 to line 163, where a portion thereof is directed to actuator 164, maintaining valve 162 in place. Further on, line 163 causes actuator 165 to shift valve 166 such that gas is directed through line 167 to actuator 168, shifting valve 169 and thereby connecting gas influent line 170' to line 171, causing actuator 172 to move valve 177 to the position shown in FIG. 7.

A snap-actuator 173' is connected to the volume 143' and when a predetermined volume has been accumulated, a predetermined minimum gas pressure is reached, at which time the snap-actuator 173' is actuated. This signals the predetermining counter 174 which counts the pulse and at the same time actuates the snap-actuator 175' for valve 176'. This dumps the volume 143' quickly and then closes, whereupon the volume refills through the orifice 147'. Refilling continues to the predetermined minimum pressure at which the snap-actuator 173' is actuated and this again signals the predetermining counter 174, which counts another pulse. This operation continues until the predetermining counter has counted the number of pulses determined in advance which correspond to the length of the heated regeneration cycle. When this number has been counted, the predetermining counter actuates the pneumatic actuators 177 and 178 of valves 152 and 179, respectively. Actuation of valves 152 and 179 vents lines 150 and 154, allowing steam valves 153 and 149 to close, thus terminating the heating cycle. Purge flow continues through orifice 132 and lines 131 and 135 through the vessel 106, cooling the desiccant bed (and structure) in preparation for switching the driving flow to that vessel.

At the same time that predetermining counter 174 starts counting fill-dump cycles, so does predetermining counter 120. Predetermining counter 120 has a cycle time equal to that needed to heat regenerate the off-stream vessel plus the time needed to heat regenerate the off-stream vessel plus the time need to cool the off-stream cycle. This sum is equal to the drying cycle less the time for repressurization of the off-stream vessel.

A snap-actuator 180' is connected to the volume 119', and when a predetermined volume has been accumulated, a predetermined minimum gas pressure is reached, at which the snap-actuator 180' is actuated. This signals the predetermining counter 120, which counts the pulse and at the same time actuates the snap-actuator 181' for valve 182'. This dumps the volume quickly and then closes, whereupon the volume refills through the orifice 141'. Refilling continues to the predetermined minimum pressure at which the snap-actuator 180' is actuated, and this again signals the predetermining counter 120, which counts another pulse. This operation continues until the predetermining counter has counted the number of pulses determined in advance, which corresponds to the length of a drying cycle. When this number has been counted, the predetermining counter actuates the snap-actuator 121' shifting the valve 144' and putting the line 170' in connection with the line 145' for the repressurization cycle.

This shifting of valve 144' also vents lines 156' 161 and 159'. The venting of line 161 allows for the venting of line 163 through valve 162. This depressurizes actuator 164, allowing valve 162 to shift, as pressure is maintained on actuator 182 through line 183 off line 171. Effluent gas off line 145 closes valve 122, allowing vessel 106 to pressurize through orifice 131 and check valve 136, while also closing both steam valves 149 and 153, with gas flow through shuttle valve 192 activating both valves 152 and 179. Another portion of gas off line 145 passes through lines 197' and 198' for resetting predetermining counters 120 and 174, respectively.

Influent gas now passes through the orifice 146' into volume 142' where the gas accumulates until a predetermined actuating pressure for the snap-actuator 148' of four-way valve 144' is reached, whereupon the valve again shifts, once again connecting the influent gas line 140' with line 156'. Line 145 depressurizes allowing purge shut-off valve 122 to open and steam valves 149 and 153 to close. Now however the valve 162 has shifted, and line 161 is led to line 184 and thusly to actuators 185 and 193, causing valve 186 to shift, with actuator 193 holding valve 162 in place. Valve 186 having shifted connects lines 170 and 194 causing valve 169 to shift as actuator 195 is activated.

Line 171 is now vented through valve 169 and line 155 is pressurized through valve 169 and thereby from line 170'. Actuator 196 is pressurized off line 155. Actuator 172 is pressurized through lines 155 and 187, shifting valve 117 and directing inlet flow through valve 117 and line 123 to vessel 106. Steam valve 153 is shifted open by gas flow from line 154 through valve 179 from line 155. The right vessel 106 is on-stream, on the adsorption cycle, for drying, and the left vessel 103 is off-stream being regenerated.

Accordingly, influent gas flow proceeds past the four-way valve 144' through lines 156', 158' and 159', past snap-actuated valves 157' and 160', and orifices 141' and 147' into volumes 119' and 143' and accumulates until a predetermined minimum pressure at which snap-actuators 180' and 173' are actuated is reached. This sends a pulse to the predetermining counters 120, 174 which sends a pulse to the valves 182 and 176, opening the valves, and dumping the volume. These valves close, and gas once again begins accumulating in the respective volumes. When the predetermined actuating pressure for the snap-actuators 180', 173' are reached, another pulse is sent to the predetermining counters 120, 174, and this continues until the preset count has been reached. This is reached first on predetermining counter 174, terminating the heating cycle, and second on predetermining counter 120, initiating repressurization, both as earlier described, and starting the cycle over again.

The dryer systems of the invention can be used with any type of sorbent adapted to absorb moisture from gases. Activated carbon, alumina, silica gel, magnesia, various metal oxides, clays, fuller's earth, bone char, and Mobilbeads, and like moisture-adsorbing compounds can be used as the desiccant.

Molecular sieves can also be used, since in many cases these have moisture-removing properties. This class of materials includes zeolites, both naturally-occuring and synthetic, the pores in which may vary in diameter from the order of several angstrom units to from 12 to 15 A. or more. Chabasite and analcite are representative natural zeolites that can be used. Synthetic zeolites that can be used include those described in U.S. Pat. Nos. 2,442,191 and 2,306,610. All of these materials are well known as desiccants, and detailed descriptions thereof will be found in the literature.

The dryers described and shown in the drawings are all adapted for purge flow regeneration with the purge passing in counterflow to the wet gas influent. This, as is well known, is the most efficient way of utilizing a desiccant bed. As a wet gas passes through a desiccant bed in one direction, the moisture content of the desiccant progressively decreases, and normally the least amount of moisture will have been adsorbed at the outlet end of the bed. It is consequently only sound engineering practice to introduce the regenerating purge gas from the outlet end, so as to avoid driving moisture from the wetter part of the bed into the drier part of the bed, and thus lengthen the regeneration cycle time required. If the purge flow be introduced at the outlet end, then the moisture present there, although it may be in a small amount, will be removed by the purge flow and brought towards the wetter end of the bed. Thus, the bed is progressively regenerated from the outlet end, and all the moisture is carried for the least possible distance through the bed before it emerges at the inlet end.

While the invention has been described with principal emphasis on a desiccant dryer and a process for drying gases, it will be apparent to those skilled in the art that this apparatus with a suitable choice of sorbent can be used for the separation of one or more gaseous components from a gaseous mixture. In such a case, the adsorbed component can also be removed from the sorbent by application of heat, and optionally, in addition, a reduction in pressure, during regeneration. Thus, the process can be used for the separation of hydrogen from petroleum hydrocarbon streams and other gas mixtures containing the same, for the separation of oxygen from nitrogen, for the separation of olefins from saturated hydrocarbons, and the like. Those skilled in the art are aware of sorbents which can be used for this purpose.

In many cases, sorbents useful for the removal of moisture from air can also be used, preferentially to adsorb one or more gas components from a mixture thereof, such as activated carbon, glass wool, adsorbent cotton, metal oxides and clays such as attapulgite and bentonite, fuller's earth, bone char and natural and synthetic zeolites. The zeolites are particularly effective for the removal of nitrogen, hydrogen and olefins, such as ethylene or propylene, from a mixture with propane and higher paraffin hydrocarbons, or butene or higher olefins. The selectivity of a zeolite is dependent upon the pore size of the material. The available literature shows the selective adsorptivity of the available zeolites, so that the selection of a material for a particular purpose is rather simple and forms no part of the instant invention. In some cases, the sorbent can be used to separate a plurality of materials in a single pass. Activated alumina, for example, will adsorb both moisture vapor and carbon dioxide, in contrast to Mobilbeads which will adsorb only water vapor in such a mixture.

The apparatus employed for this purpose will be the same as that described and shown in FIGS. 1 to 7, inclusive, and the process is also as described, suitably modified according to the proportions of the components to be separated, the operating pressure and temperature and the volume of available sorbent.

It will, however, be understood that the process is of particular application in the drying of gases, and that this is the preferred embodiment of the invention.

Having regard to the foregoing disclosure, the following is claimed as the inventive and patentable embodiments thereof:

1. A process for fractionating gas mixtures while effectively timing the adsorption cycle of at least one sorbent bed in proportion to the amount of unadsorbed effluent of a gas mixture that has passed through the bed during the adsorption cycle, and providing a flow of effluent gas while the bed is on the adsorption cycle, comprising passing a mixture of first and second gases through one sorbent bed and adsorbing first gas from the mixture thereof with the second gas to reduce the concentration of the first gas in the mixture to below a desired maximum concentration; and delivering a flow of second gas as effluent from the sorbent bed while that bed is on the adsorption cycle; separating and withdrawing a small proportion of system gas and timing the duration of the adsorption cycle on the sorbent bed by accumulating the withdrawn system gas at a flow rate proportional to the flow rate of delivery of effluent gas from the sorbent bed while that bed is on the adsorption cycle, and then discontinuing the adsorption cycle when the amount of accumulated withdrawn system gas reaches a predetermined total related to adsorption capacity of the bed before the adsorption front can leave the bed, and dumping the accumulated gas; and then repeating the cycle, so as to provide a flow of effluent gas from the sorbent bed while that bed is on the adsorption cycle.

2. A process according to claim 1, in which the withdrawn system gas is effluent gas.

3. A process according to claim 1, in which withdrawn system gas is effluent gas mixture.

4. A process according to claim 1, in which the predetermined total of withdrawn system gas is determined as volume.

5. A process according to claim 1, in which the predetermined total of withdrawn system gas is determined as pressure.

6. A process according to claim 5, which comprises sensing the pressure of accumulated withdrawn system gas, and signalling when a predetermined minimum pressure is reached.

7. A process according to claim 6, which comprises discontinuing the adsorption cycle when the predetermined minimum pressure is reached.

8. A process according to claim 1, in which the concentration of a first gas in a mixture thereof with a second gas is reduced to below a limiting maximum concentration thereof in the second gas, by passing the mixture in contact with and from one end to another end of a sorbent bed containing a sorbent having a preferential affinity for the first gas, adsorbing first gas thereon to form a gaseous effluent having a concentration thereof below the maximum, separating and collecting a proportion of the system gas, and then discontinuing passing the gaseous mixture in contact with the bed whenever the volume or pressure of collected system gas reaches a predetermined amount.

9. A process in accordance with claim 1, which comprises desorbing first gas from the bed by passing a purge flow of gas low in concentration of said first gas in contact with the bed, and then repeating the adsorption and desorption cycles in sequence.

10. A process in accordance with claim 1, which comprises removing sorbed first gas from the bed at an elevated temperature sufficient to desorb said first gas.

11. A process in accordance with claim 1, which includes removing sorbed first gas from the bed at a pressure below the pressure at which adsorption is effected.

12. A process in accordance with claim 1, which includes removing sorbed first gas from the bed at a pressure below atmospheric.

13. A process in accordance with claim 1, which comprises employing two beds of sorbent, a first of which is on a cycle for adsorption of the first gas, while the other of which is on a cycle for desorption of the first gas by a purge flow comprising effluent gas from the first bed.

14. A process in accordance with claim 13, wherein the bed on a desorption cycle is subjected to the purge flow at room temperature.

15. A process in accordance with claim 14, wherein the bed on a desorption cycle is subjected to the purge flow at an elevated temperature sufficient to aid in desorbing said first gas.

16. A process in accordance with claim 14, wherein the bed on a desorption cycle is subjected to the purge flow at a pressure less than that for the adsorption cycle.

17. An apparatus for continuously fractionating gas mixtures to remove a first gas from a mixture thereof with another gas while effectively timing the adsorption cycle of each of at least two sorbent beds in proportion to the amount of unadsorbed effluent of a gas mixture that has passed through the bed during the adsorption cycle, and providing a continuous flow of effluent gas, comprising, as essential components, at least two sorbent beds for adsorbing a first gas and adapted for periodic regeneration, one bed being regenerated while another bed is on the adsorption cycle; means for separating and withdrawing a small proportion of system gas flowing through one bed on the adsorption cycle, and passing such effluent gas through another of the two sorbent beds to regenerate the bed by removing sorbed first gas; means for separating and withdrawing a further small proportion of such effluent gas; a gas accumulator for timing the duration of the adsorption cycle by collecting withdrawn system gas; means for admitting withdrawn system gas to the gas accumulator at a flow rate proportional to the delivery flow rate of effluent gas from the sorbent bed on the adsorption cycle; means bypassing the gas accumulator for delivering a continuous flow of the remaining effluent gas; sensing means in communication with the gas accumulator responsive to a predetermined total amount of withdrawn system gas in the accumulator to discontinue the adsorption cycle at a time related to adsorption capacity of the bed before the adsorption front can leave the bed and expel the accumulated gas, preliminary to another timing cycle, and means for placing a regenerated sorbent bed onstream for adsorption and passing effluent gas from the regenerated bed to regenerate the sorbent bed on adsorption so as to provide a continuous flow of effluent gas from the sorbent bed on the adsorption cycle, timing the duration of the adsorption cycle on the regenerated sorbent bed as before, and then repeating the cycle, so as to provide a continuous flow of effluent gas from the sorbent bed on the adsorption cycle.

18. An apparatus in accordance with claim 11, in which the sorbent bed is arranged for counterflow regeneration.

19. An apparatus in accordance with claim 17, comprising means for heating the bed of sorbent in the vessel to an elevated temperature sufficient to aid in desorbing first gas sorbed thereon.

20. An apparatus in accordance with claim 17, comprising means for reducing pressure during desorption to below the pressure during adsorption.

21. An apparatus in accordance with claim 17, wherein the vessel is heaterless.

22. An apparatus according to claim 17, comprising means for sensing an increase in the volume of system gas collected in the gas accumulator.

23. An apparatus in accordance with claim 22, in which the gas accumulator is an expansible reservoir which upon reaching a predetermined increased volume gives a signal.

24. An apparatus in accordance with claim 22, comprising means for sensing an increase in pressure of system gas collected in the gas accumulator.

25. An apparatus in accordance with claim 24, in which a pressure-sensitive sensor is connected to the gas accumulator responding to and giving a signal when a predetermined minimum pressure is reached.

26. An apparatus in accordance with claim 25, in which the sensor discontinues the adsorption cycle.

27. An apparatus in accordance with claim 25, in which the sensor dumps the contents of the gas accumulator.

28. An apparatus in accordance with claim 27, comprising a counter responsive to the number of dumpings of the gas accumulator and giving a signal after a predetermined number of such dumpings.

29. An apparatus in accordance with claim 17, in which the means for withdrawing system gas is arranged to withdraw effluent gas and feed this to the gas accumulator.

30. An apparatus in accordance with claim 29 in which the means for withdrawing system gas is arranged to withdraw influent gas and feed this to the gas accumulator.

31. A process for continuously fractionating gas mixtures while effectively timing the adsorption cycle of each of at least two sorbent beds in proportion to the amount of unadsorbed effluent of a gas mixture that has passed through the bed during the adsorption cycle and providing a continuous flow of effluent gas, comprising passing a mixture of first and second gases through a first sorbent bed and adsorbing first gas from the mixture thereof with the second gas to reduce the concentration of the first gas in the mixture to below a desired maximum concentration; and delivering a continuous flow of second gas as effluent from the first sorbent bed on the adsorption cycle; separating and withdrawing a small proportion of effluent gas; and timing the duration of the adsorption cycle on the first sorbent bed by accumulating the withdrawn effluent gas at a flow rate proportional to the flow rate of delivery of effluent gas from the first sorbent bed on the adsorption cycle; and then discontinuing the adsorption cycle when the amount of accumulated withdrawn effluent gas reaches a predetermined total related to adsorption capacity of the bed before the adsorption front can leave the bed, and dumping the accumulated gas; and then repeating the cycle, so as to provide a continuous flow of effluent gas from the sorbent bed on the adsorption cycle.

32. A process according to claim 31, in which the withdrawn system gas is effluent gas.

33. A process according to claim 31, in which withdrawn system gas is influent gas mixture.

34. A process according to claim 31, in which the predetermined total of withdrawn system gas is determined as volume.

35. A process according to claim 31, in which the predetermined total of withdrawn system gas is determined as pressure.

36. A process according to claim 31, which comprises sensing the pressure of accumulated withdrawn system gas, and signalling when a predetermined minimum pressure is reached.

37. A process according to claim 31, which comprises discontinuing the adsorption cycle when the predetermined minimum pressure is reached.

38. A process according to claim 31, in which the concentration of a first gas in a mixture thereof with a second gas is reduced to below a limiting maximum concentration thereof in the second gas, by passing the mixture in contact with and from one end to another end of a sorbent bed containing a sorbent having a preferential ability for the first gas, adsorbing first gas thereon to form a gaseous effluent having a concentration thereof below the maximum, separating and collecting a proportion of the system gas, and then discontinuing passing the gaseous mixture in contact with the bed whenever the volume or pressure of collected system gas reaches a predetermined amount.

39. A process according to claim 31, which comprises desorbing first gas from the bed by passing a purge flow of gas low in concentration of said first gas in contact with the bed, and then repeating the adsorption and desorption cycles in sequence.

40. A process in accordance with claim 31, which comprises removing sorbed first gas from the bed at an elevated temperature sufficient to desorb said first gas.

41. A process in accordance with claim 31, which includes removing sorbed first gas from the bed at a pressure below the pressure at which adsorption is effected.

42. A process in accordance with claim 31, which includes removing sorbed first gas from the bed at a pressure below atmospheric.

43. A process in accordance with claim 31, wherein the bed on a desorption cycle is subjected to the purge flow at room temperature.

44. A process in accordance with claim 31, wherein the bed on a desorption cycle is subjected to the purge flow at an elevated temperature sufficient to aid in desorbing said first gas.

45. A process in accordance with claim 31, wherein the bed on a desorption cycle is subjected to the purge flow at a pressure less than that for the adsorption cycle.

46. An apparatus for fractionating gas mixtures to remove a first gas from a mixture thereof with another gas while effectively timing the adsorption cycle of a sorbent bed in proportion to the amount of unadsorbed effluent of a gas mixture that has passed through the bed during the adsorption cycle, comprising, as essential components, a sorbent bed for adsorbing a first gas and adapted for periodic regeneration; means for separating and withdrawing a small proportion of system gas flowing through the bed while the bed is on the adsorption cycle; a gas accumulator for timing the duration of the adsorption cycle by collecting withdrawn system gas; means for admitting withdrawn system gas to the gas accumulator at a flow rate proportional to the delivery flow rate of effluent gas from the sorbent bed on the adsorption cycle; means bypassing the gas accumulator for delivering a flow of the remaining effluent gas; sensing means in communication with the gas accumulator responsive to a predetermined total amount of withdrawn system gas in the accumulator to discontinue the adsorption cycle at a time related to adsorption capacity of the bed before the adsorption front can leave the bed and expel the accumulated gas, preliminary to another timing cycle; and then repeating the cycle, so as to provide a flow of effluent gas from the sorbent bed while that bed is on the adsorption cycle.

47. An apparatus in accordance with claim 46, in which the sorbent bed is arranged for counterflow regeneration.

48. An apparatus in accordance with claim 46, comprising a pair of vessels, each having chambers therein for a bed of sorbent, and each having lines for reception of influent gas and for delivery of effluent gas.

49. An apparatus in accordance with claim 48, comprising means for diverting a portion of effluent gas from the one vessel to the other vessel for purge flow desorption of sorbed first gas from the bed.

50. An apparatus in accordance with claim 46, comprising means for heating the bed of sorbent in the vessel to an elevated temperature sufficient to aid in desorbing first gas sorbed thereon.

51. An apparatus in accordance with claim 46, comprising means for reducing pressure during desorption to below the pressure during adsorption.

52. An apparatus in accordance with claim 46, wherein the vessel is heaterless.

53. An apparatus according to claim 46, comprising means for sensing an increase in the volume of system gas collected in the gas accumulator.

54. An apparatus in accordance with claim 53, in which the gas accumulator is an expansible reservoir which upon reaching a predetermined increased volume gives a signal.

55. An apparatus in accordance with claim 46, comprising means for sensing an increase in pressure of system gas collected in the gas accumulator.

56. An apparatus in accordance with claim 55, in which a pressure-sensitive sensor is connected to the gas accumulator responding to and giving a signal when a predetermined minimum pressure is reached.

57. An apparatus in accordance with claim 56, in which the sensor discontinues the adsorption cycle.

58. An apparatus in accordance with claim 56, in which the sensor dumps the contents of the gas accumulator.

59. An apparatus in accordance with claim 58, comprising a counter responsive to the number of dumpings of the gas accumulator and giving a signal after a predetermined number of such dumpings.

60. An apparatus in accordance with claim 46, in which the means for withdrawing system gas is arranged to withdraw effluent gas and feed this to the gas accumulator.

61. An apparatus in accordance with claim 60 in which the means for withdrawing system gas is arranged to withdraw influent gas and feed this to the gas accumulator.

* * * * *

UNITED STATES PATENT AND TRADEMARK OFFICE
CERTIFICATE OF CORRECTION

PATENT NO. : 4,205,967
DATED : June 3, 1980
INVENTOR(S) : Leslie W. Sandman

It is certified that error appears in the above-identified patent and that said Letters Patent are hereby corrected as shown below:

Column 3, line 46 : "mixture" should be --mixtures--.
Column 3, line 66 : "being" should be --before--.
Column 5, line 30 : "apparaturs" should be --apparatus--.
Column 7, line 1 : "vessles" should be --vessels--.
Column 7, line 6 : "vessel" should be --vessels--.
Column 8, line 25 : "repressurized" should be --repressurizes--.
Column 8, line 28 : "continued" should be --continues--.
Column 8, line 68 : "cleam" should be --clean--.
Column 9, line 41 : delete "of" after "tank 2".
Column 10, line 12 : "the" first occurrence should be --to--.
Column 10, line 16 : "is" should be --in--.
Column 12, line 68 : "19" should be --119--.
Column 14, line 18 : "pressurization" should be --repressurization--.
Column 14, line 60 : "is" should be --in--.
Column 15, line 28 : "sorgent" should be --sorbent--.
Column 19, line 26 : "need" should be --needed--.
Column 20, line 36 : "absorb" should be --adsorb--.
Column 22, line 13 : "effluent" should be --influent--.

UNITED STATES PATENT AND TRADEMARK OFFICE
CERTIFICATE OF CORRECTION

PATENT NO. : 4,205,967

Page 2 of 2

DATED : June 3, 1980

INVENTOR(S) : Leslie W. Sandman

It is certified that error appears in the above-identified patent and that said Letters Patent are hereby corrected as shown below:

Column 23, line 45 : "11" should be --17--.
Column 24, line 68 : "ability" should be --affinity--.

Signed and Sealed this

Twenty-first Day of October 1980

[SEAL]

Attest:

SIDNEY A. DIAMOND

Attesting Officer

Commissioner of Patents and Trademarks